(12) United States Patent
Chi et al.

(10) Patent No.: US 9,928,571 B2
(45) Date of Patent: Mar. 27, 2018

(54) STRETCHABLE DISPLAY DEVICE AND OPERATING METHOD THEREOF

(71) Applicant: LG ELECTRONICS INC., Seoul (KR)

(72) Inventors: Jumin Chi, Seoul (KR); Sanghyun Eim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 14/721,717

(22) Filed: May 26, 2015

(65) Prior Publication Data

US 2016/0284049 A1  Sep. 29, 2016

(30) Foreign Application Priority Data

Mar. 23, 2015  (KR) .......................... 10-2015-0040116

(51) Int. Cl.
*G06T 3/40* (2006.01)
*G06F 1/16* (2006.01)
*G06F 3/041* (2006.01)
*G06F 3/0488* (2013.01)

(52) U.S. Cl.
CPC .............. *G06T 3/40* (2013.01); *G06F 1/1652* (2013.01); *G06F 3/0414* (2013.01); *G06F 3/04886* (2013.01); *G06F 2203/04102* (2013.01); *G06F 2203/04803* (2013.01); *G06F 2203/04806* (2013.01)

(58) Field of Classification Search
None
See application file for complete search history.

(56) References Cited

U.S. PATENT DOCUMENTS

| 6,297,805 | B1* | 10/2001 | Adler | .................. G06F 1/16 |
| | | | | 345/158 |
| 6,504,588 | B1* | 1/2003 | Kaneko | .............. G02F 1/13363 |
| | | | | 349/104 |
| 2010/0097338 | A1* | 4/2010 | Miyashita | ........... G06F 3/04883 |
| | | | | 345/173 |
| 2013/0135182 | A1* | 5/2013 | Jung | ..................... G09G 3/00 |
| | | | | 345/30 |

(Continued)

FOREIGN PATENT DOCUMENTS

| EP | 2 177 983 A2 | 4/2010 |
| EP | 2 597 558 A1 | 5/2013 |
| EP | 2 725 471 A2 | 4/2014 |

*Primary Examiner* — Yu Chen

(74) *Attorney, Agent, or Firm* — Birch, Stewart, Kolasch & Birch, LLP

(57) ABSTRACT

A stretchable display device including a display unit configured to be stretched in at least one direction; a sensing unit configured to sense information on a stretching force applied to the display unit; and a controller configured to stretch the display unit an amount corresponding to the stretching force applied to the display unit, stretch an entire area of the display unit in response to the stretching force being applied to the display unit without an area designation input for designating a partial area of the display unit to be stretched, and stretch the partial area of the display unit in response to the stretching force being applied to the display unit with the area designation input being applied to the display unit.

15 Claims, 36 Drawing Sheets

(56) References Cited

U.S. PATENT DOCUMENTS

| | | | | |
|---|---|---|---|---|
| 2014/0098028 A1* | 4/2014 | Kwak | ............... | G09G 5/00 |
| | | | | 345/173 |
| 2014/0098075 A1* | 4/2014 | Kwak | ............... | G06F 3/0487 |
| | | | | 345/204 |
| 2015/0009129 A1* | 1/2015 | Song | ............... | G06F 1/1652 |
| | | | | 345/156 |
| 2015/0348453 A1* | 12/2015 | Jin | ............... | G09F 9/301 |
| | | | | 345/173 |
| 2016/0026220 A1* | 1/2016 | Stroetmann | ....... | G02F 1/133308 |
| | | | | 345/173 |
| 2016/0255713 A1* | 9/2016 | Kim | ............... | G06F 1/1652 |
| | | | | 361/749 |

\* cited by examiner

FIG. 3
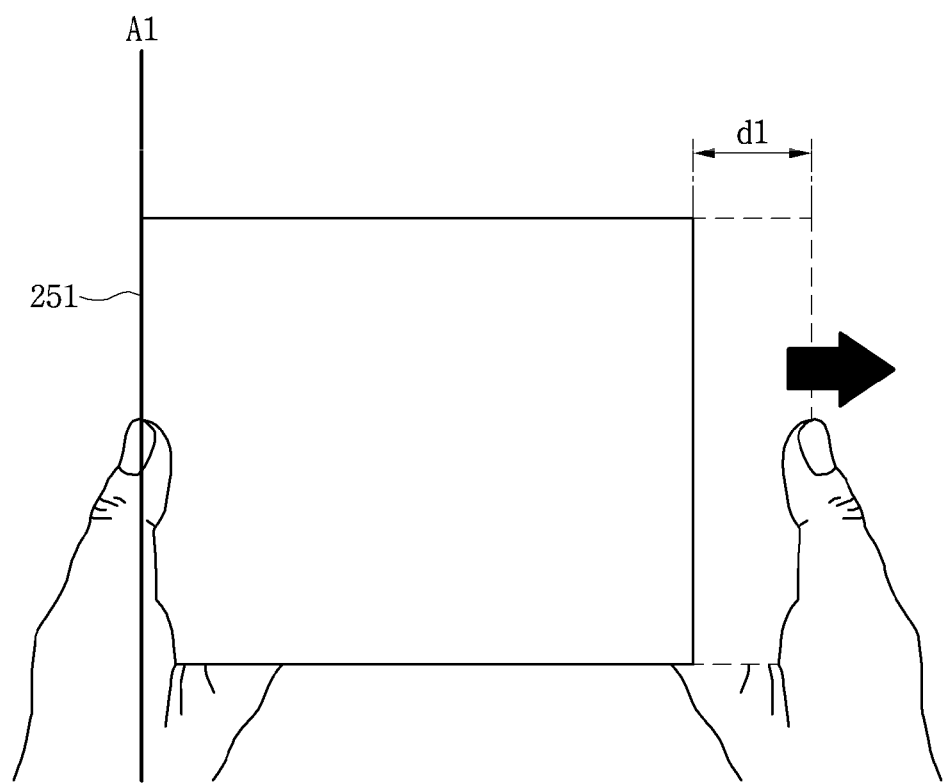
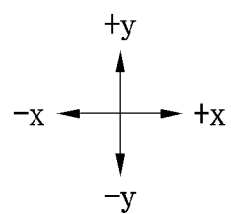

FIG. 11
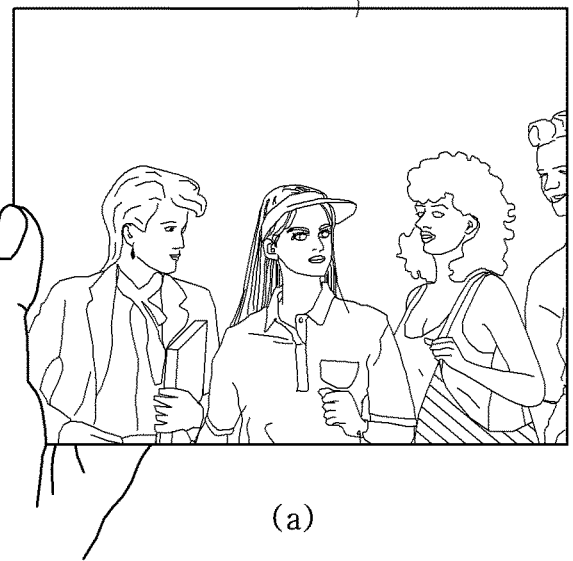
(a)
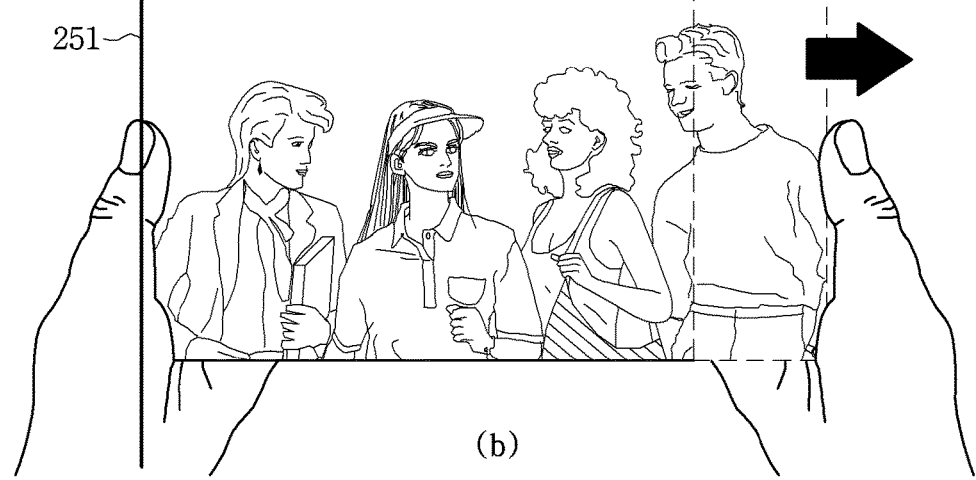
(b)

In this Newbery Medal-winning
Tree-ear, an orphan, lives und
bridge in Ch'ulp'o, a potters'
famed for delicate celadon war
has become fascinated with the
potter's craft; he wants nothi
than to watch master potter Mi
work, and he dreams of making
of his own someday.

(a)

250    A1    305    d1

In this Newbery Medal-winning book,
Tree-ear, an orphan, lives under a
bridge in Ch'ulp'o, a potters' village
famed for delicate celadon ware. He
has become fascinated with the
potter's craft; he wants nothing more
than to watch master potter Min at
work, and he dreams of making a pot
of his own someday.

251    303

(b)

FIG. 15
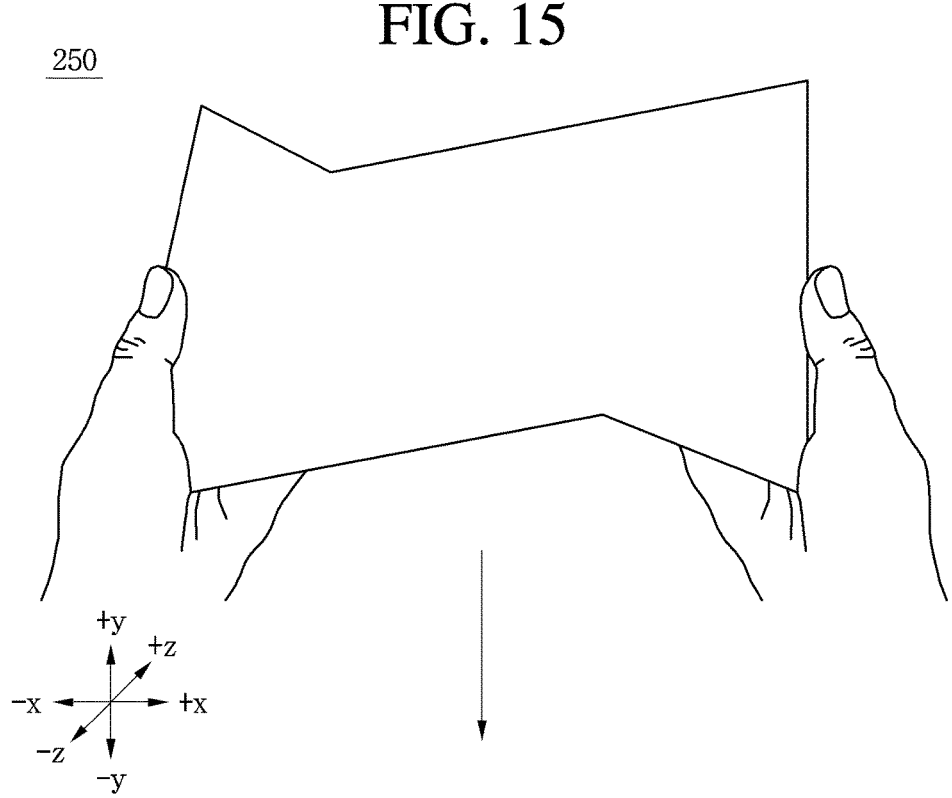
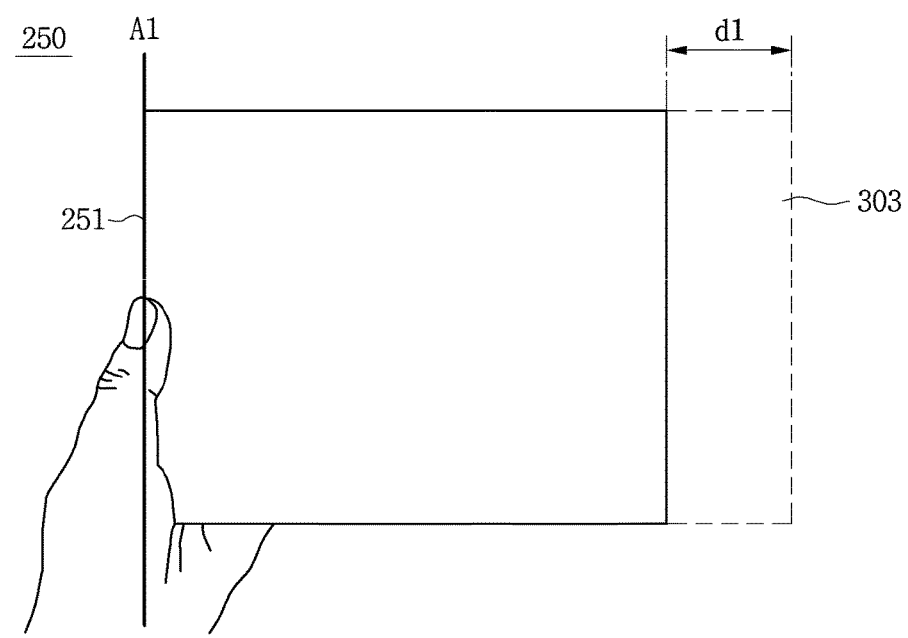

STRETCHABLE DISPLAY DEVICE AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2015-0040116, filed on Mar. 23, 2015, which is hereby incorporated by reference in its entirety.

BACKGROUND OF THE INVENTION

Field of the Invention

The present disclosure relates to a display device and an operation method thereof.

Discussion of the Related Art

Deformable display devices such as folded, rolled in a roll type, or stretchable in at least one direction are being researched and developed. Since these displays are deformable in various types, display enlargement and display miniaturization are requested. Furthermore, because the display device is deformable, efficiently displaying information is needed.

SUMMARY OF THE INVENTION

Embodiments provide a stretchable display device capable of being stretched only with a simple operation according to a user's request.

Embodiments also provide a stretchable display device capable of obtaining a stretch criterion according to a direction of an applied force or a specific input, and stretching a display unit according to the obtained stretch criterion.

Embodiments also provide a stretchable display device capable of improving user's convenience by stretching a display unit to display hidden information before the stretch or by stretching the display unit for enabling information displayed before the display unit is stretched to be enlarged and displayed.

In one embodiment, a method of operating a stretchable display device including a stretchable display unit includes: obtaining a stretch criterion that is a criterion for stretching the display unit on a basis of any one of a direction of a force applied to the display unit and an area designation input for stretching a partial area of the display unit; and stretching the display unit according to the obtained stretch criterion.

In another embodiment, a stretchable display device includes: a display unit stretched in at least one direction; a sensing unit sensing information on a force applied to the display unit; and a controller obtaining a stretch criterion that is a criterion for stretching the display unit on a basis of any one of a direction of a force applied to the display unit and an area designation input for stretching a partial area of the display unit, and stretching the display unit according to the obtained stretch criterion.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 3 to 10 are views illustrating various embodiments that when an area to be stretched in an entire area formed by a display unit is not designated, the display unit is stretched according to a force applied to the display unit.

FIGS. 11 and 12 include views illustrating various examples showing information provided while a display unit is stretched according to a force applied to the display unit when an area to be stretched in an entire area formed by a display unit is not designated according to embodiments.

FIGS. 15 and 16 are views illustrating examples that a display unit in a stretched state is fixed or returned to an original state according to various embodiments.

DETAILED DESCRIPTION OF THE EMBODIMENTS

Reference will now be made in detail to the embodiments of the present disclosure, examples of which are illustrated in the accompanying drawings, in which like numbers refer to like elements throughout, and a repetitive explanation will be omitted. In the following description, usage of suffixes such as 'module', 'part' or 'unit' used for referring to elements is given merely to facilitate explanation of the present invention, without having any significant meaning by itself.

In addition, the accompanying drawings are used to help easily understand the technical idea of the present invention and it should be understood that the idea of the present invention is not limited by the accompanying drawings. This invention should not be construed as limited to specific disclosure forms, and the spirit and scope of the invention should be understood as incorporating various modifications, equivalents and substitutions.

Although the terms first, second, etc. may be used herein to describe various elements, these elements should not be limited by these terms. These terms are only used to distinguish one element from another. When an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

As used herein, the singular forms "a," "an" and "the" are intended to include the plural forms as well, unless the context clearly indicates otherwise. Further, the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof.

Figure 1A:
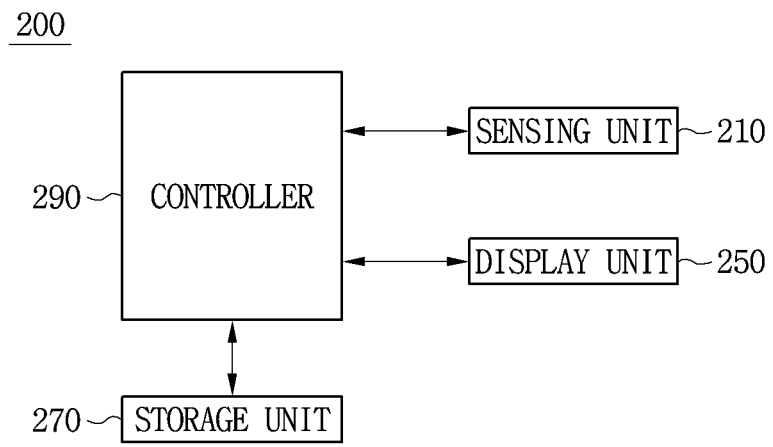
FIG. 1(a) is a block diagram of a stretchable display device according to an embodiment of an embodiment.
Figure 1B:
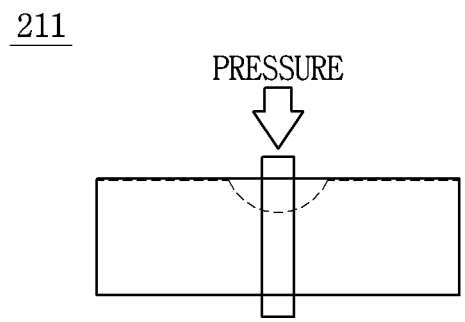
FIG. 1(b) is a view illustrating a pressure sensor configuring a sensing unit.
Figure 1C:
FIG. 1(c) is a view illustrating a configuration of the display unit in which the sensing unit includes a plurality of acceleration sensors.

FIGS. 1(a) to 1(c) are block diagrams of a stretchable display device according to an embodiment. In particular, FIG. 1(a) is a block diagram illustrating a configuration of a stretchable display device 200 according to an embodiment, FIG. 1(b) is a view illustrating a pressure sensor 211 configuring a sensing unit 210, and FIG. 1(c) is a view illustrating a configuration of a display unit 250 in which the sensing unit 210 includes a plurality of acceleration sensors 213-1 to 213-4.

The stretchable display device 200 according to an embodiment is a next generation display device to be realizable in a diverse and new environment since it is stretchable as well as flexible, unlike a typical display device realized only with a hard material such as glass or silicon. In other words, the stretchable display device 200 is a device that is stretched when pulled, and contracted again to an original state when released.

Referring to FIG. 1(a), the stretchable display device 200 may include a sensing unit 210, a display unit 250, a storage unit 270, and a controller 290. The sensing unit 210 may sense a strength and direction of a force applied to the display unit 250.

In an embodiment, the sensing unit 210 may include one or more pressure sensors. The one or more pressure sensors may be disposed in the display unit 250. When the sensing unit 210 includes one or more pressure sensors, each pressure sensor 211 may detect a change in capacitance or resistance between both ends of an area to which pressure (i.e., force) is applied, as illustrated in FIG. 1(b). The pressure sensor 211 can deliver to the controller 290 any one or more of a capacitance change signal representing a change of the detected capacitance or a resistance change signal representing a resistance change. The capacitance change or resistance change signal may include information on one or more of strength and direction of a force applied to the pressure sensor 211. The controller 290 can obtain one or more of a direction or strength of a force applied to the display unit 250 by using the capacitance change or resistance change received from the pressure sensor 211.

In another embodiment, the sensing unit 210 may include the plurality of acceleration sensors 213-1 to 213-4 as illustrated in FIG. 1(c). When the display unit 250 has a rectangular shape, each acceleration sensor may be disposed adjacent to each rectangular vertex. When the display unit 250 includes a stretchable substrate and image display unit, the plurality of acceleration sensors 213-1 to 213-4 are disposed in the bottom end of the stretchable substrate and the image display unit may be disposed in the top end of the stretchable substrate. However, this is just an example and the plurality of acceleration sensors 213-1 to 213-4 may be embedded the stretchable substrate or image display unit.

The acceleration sensor is a sensor detecting an acceleration or shock strength when an object moves. When using the acceleration sensor, a movement state of the display unit 250 may be detected in detail. The acceleration sensor may sense an acceleration of the display unit 250 in each direction of three axes (i.e., x-axis, y-axis, and z-axis) perpendicular to each other. The controller 290 can obtain a movement velocity by using three axis acceleration values measured through an acceleration sensor. The controller 290 can obtain a distance that the display unit 250 is stretched in three axis directions by using the obtained movement velocity.

The controller 290 can obtain a direction and strength of a force applied to the display unit 250 by using the movement velocity and movement distance obtained by using the acceleration sensor. The controller 290 can stretch the display unit 250 according to the obtained direction and strength of the force.

The display unit 250 may be stretched and contracted in at least one or more directions. The display unit 250 may include a stretchable substrate and image display unit. The stretchable substrate may be configured of a material of polydimethylsiloxane (PDMS) having a good stretching characteristic and be stretched according to a pull force. The image display unit may be formed on the stretchable substrate and the stretchable substrate may be stretched according to the stretching of the stretchable substrate. The image display unit may display an image.

The storage unit 270 may store correspondence relationships between whether to receive an area designation input, the direction and strength of the force applied to the display unit 250, a stretch distance and stretch criterion.

The controller 290 can differently set the stretch criterion according to whether the area designation input is received. For example, when the area designation input is received, the controller 290 can obtain the stretch criterion corresponding to the received area designation input, and stretch a partial area of the display unit 250 according to the obtained stretch criterion and the strength and direction of the applied force.

When the area designation input is not received, the controller 290 can search the storage unit 270 and obtain the stretch criterion corresponding to a direction of a force applied to the display unit 250. The controller 290 can stretch the entire area of the display unit 250 by a stretch distance corresponding to the direction and strength of the force applied to the display unit 250.

Besides, the controller 290 can control an overall operation of the stretchable display device 200. An operation of the controller 290 will be described below in detail with reference to drawings. The stretchable display device 200 may include all elements of a mobile terminal 100 to be described later with reference to FIG. 36.

Figure 2:
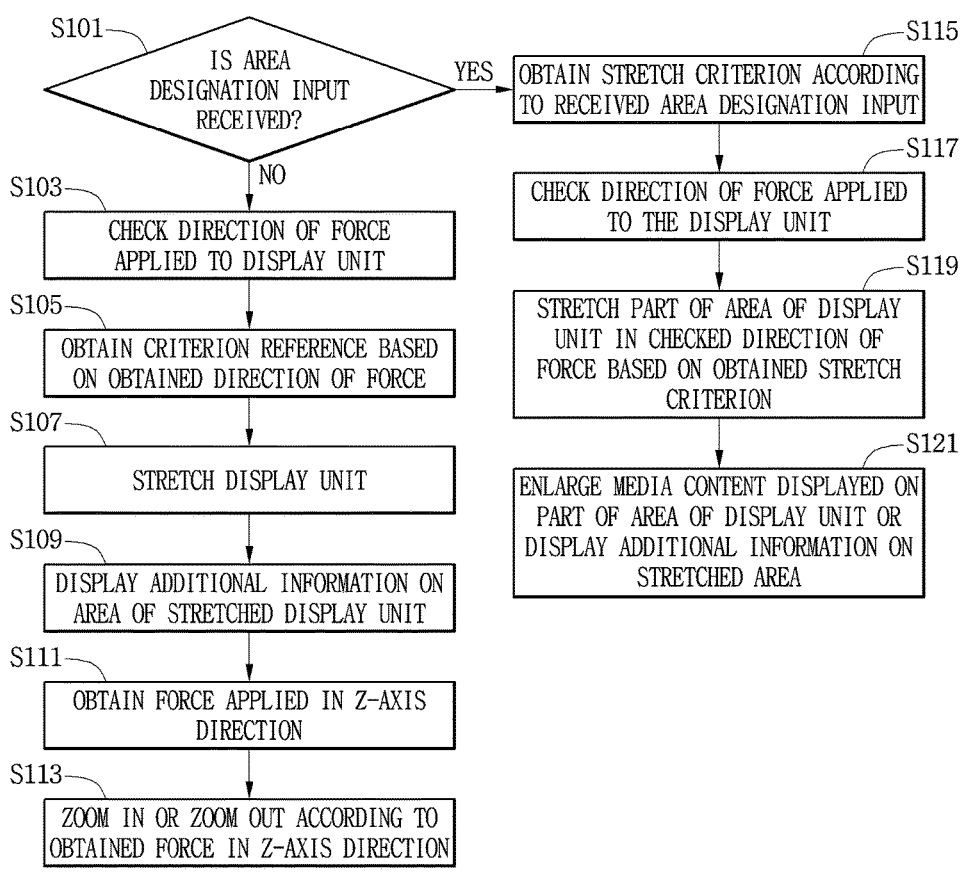
FIG. 2 is a flowchart illustrating an operation method of a stretchable display device according to an embodiment.

Next, an operation method of the stretchable display device 200 according to an embodiment will be described with reference to FIG. 2. In particular, FIG. 2 is a flowchart illustrating an operation method of a stretchable display device according to an embodiment. The controller 290 checks whether an area designation input is received for stretching only a specific area in the entire area of the display unit 250 (operation S101).

The area designation input can be an input for obtaining a stretch criterion that is a criterion to stretch only a partial area of the entire area of the display unit 250. The stretch criterion may be obtained according to the area designation input, and the partial area of the display unit may be stretched according to a direction of an applied force. This will be described later.

The area designation input can also be any one of an input for bending the display unit by applying a force to the display unit 250 and an input for designating an area of the display unit 250 through a touch pen. A detailed description about the area designation input will be provided later.

When the area designation input is not received (no in S101), the controller 290 checks the direction of the force applied to the display unit 250 (operation S103). The controller 290 checks the stretch criterion for stretching the display unit 250 based on the checked direction of the force (operation S105).

The stretch criterion may be a criterion for stretching the entire area or the partial area of the display unit 250 in correspondence to the force applied to the display unit 259. In an embodiment, the stretch criterion may be varied according to whether the area designation input is received through the display unit 250. For example, when the area designation input is received, the controller 290 can obtain the stretch criterion according to the received area designation input, and stretch a partial area of the display unit 250 according to the obtained stretch criterion and an applied force. As another example, when the area designation input is not received, the controller 290 can obtain the stretch criterion according to the direction of the applied force and stretch the entire area of the display unit 250. This will be described in detail later.

The controller 290 stretches the display unit 250 according to the obtained stretch criterion (operation S107). Hereinafter, when the area designation input is not received, various embodiments in which the entire area of the display unit 250 is stretched according to a force applied to the display unit 250.

FIGS. 3 to 10 are views illustrating various embodiments in which the display unit is stretched according to the force applied to the display unit when an area to be stretched is not designated in the entire area formed by the display unit. Hereinafter the display unit before the stretch is represented with a solid line and the display unit in a stretched state is represented with a dotted line. It is assumed that edges of the display unit lie in an x-axis or y-axis direction.

FIG. 3 is a view illustrating an example that the stretchable display unit is stretched when a force is applied in a +x-axis direction according to an embodiment. Referring to FIG. 3, the controller 290 can detect a force applied to the display unit 250 and check the direction of the detected force. When the direction of the detected force is a positive x-axis (+x-axis) direction, the controller 290 can obtain as the stretch criterion an edge or surface of the display unit 250, which is perpendicular to the +x-axis and located −x-axis that is in an opposite direction to the +x-axis direction.

In more detail, when a force is applied in the +x-axis, the controller 290 can set a reference line A1 at a first edge 251 or an extension line of the first edge 251 is perpendicular to the +x-axis and located in a −x-axis that is perpendicular to the +x-axis direction. The controller 290 can stretch the entire display unit 250 by d1 in a +x-axis direction based on the obtained reference line A1. The stretch criterion is described as the edge of the display unit 250 in an embodiment of FIG. 3, but is not limited hereto and may be a surface of the display unit 250.

A stretch distance d1 by which the display unit 250 is stretched may be varied according to the strength of the force applied to the display unit 250. For example, the stretch distance d1 may be increased in proportion to the strength of the force applied to the display unit 250. In more detail, the stretch distance d1 may be increased as the strength of the force applied in the +x-axis direction becomes greater.

Figure 4:
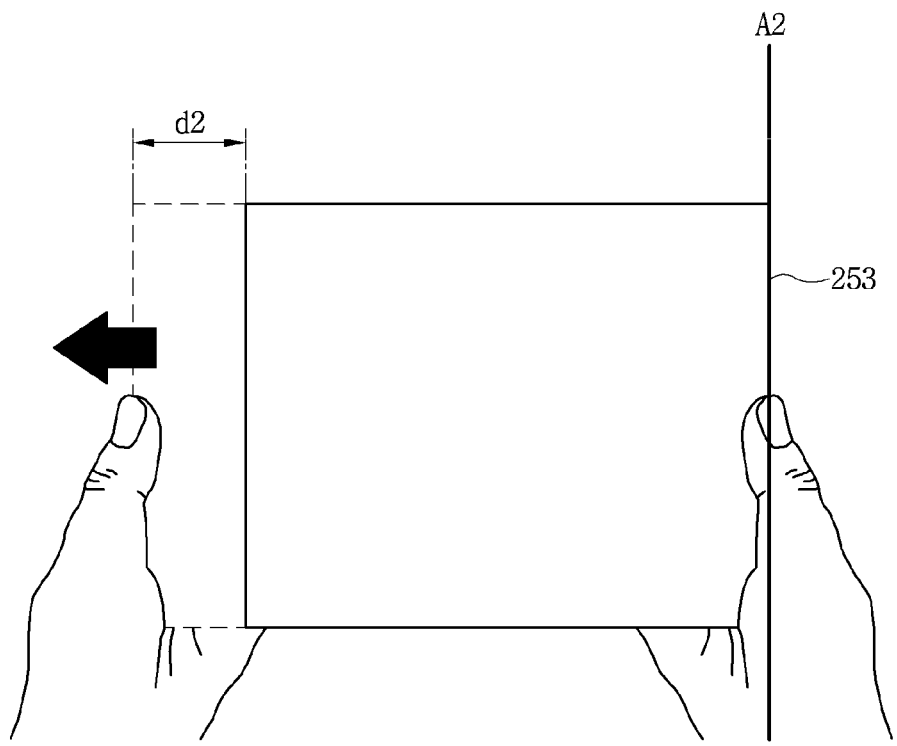

Next, description is provided with reference to FIG. 4. In particular, FIG. 4 is a view illustrating an example that the stretchable display unit is stretched when a force is applied in the −x-axis direction according to an embodiment.

Referring to FIG. 4, the controller 290 can detect a force applied to the display unit 250 and check the direction of the detected force. When the direction of the detected force is a negative x-axis (+x-axis) direction, the controller 290 can obtain as a stretch criterion an edge or surface of the display unit 250, which is perpendicular to −x-axis and located in an opposite direction to −x-axis. In more detail, when a force is applied in the −x-axis, the controller 290 can set to a reference line A2 a second edge 253 or an extension line of the second edge 253 of the display 250, which is perpendicular to the −x-axis and located in the +x-axis direction that is in opposite direction to −x-axis.

The controller 290 can stretch the entire display unit 250 by a stretch distance d2 in a −x-axis direction based on the obtained reference line A2. The stretch criterion is described as an edge of the display unit 250 in an embodiment of FIG. 4, but is not limited hereto and may be a surface of the display unit 250.

Figure 5:
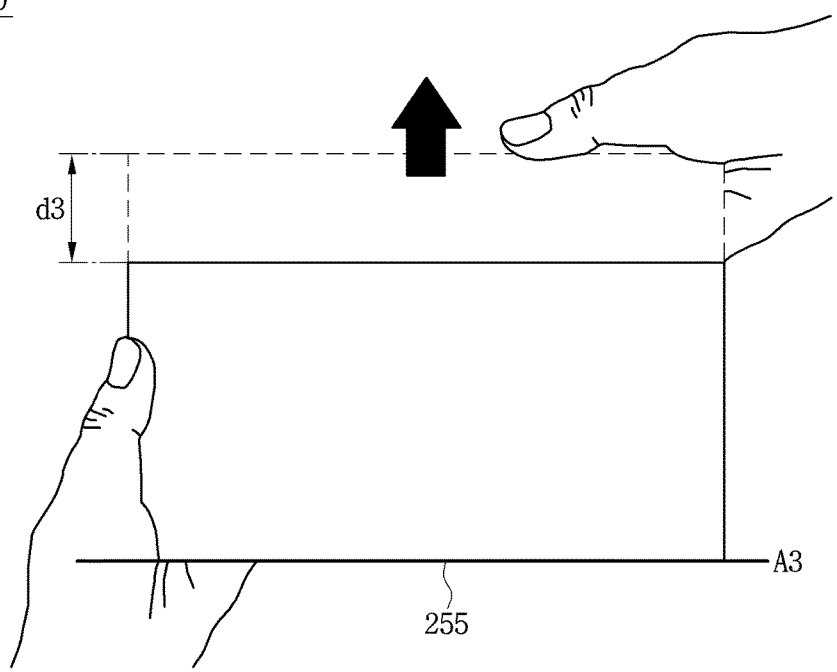

Next, description is provided with reference to FIG. 5. In particular, FIG. 5 is a view illustrating an example that the stretchable display unit is stretched when a force is applied in a +y-axis direction according to an embodiment. Referring to FIG. 5, the controller 290 can detect the force applied to the display unit 250 and check a direction of the detected force. When the direction of the detected force is a positive y-axis (+y-axis) direction, the controller 290 can obtain as a stretch criterion an edge or surface of the display unit 250, which is perpendicular to +y-axis and located in an opposite direction to +y-axis.

In more detail, when a force is applied in the +y-axis, the controller 290 can obtain as a reference line A3 a third edge 255 or an extension line of the third edge 255 that is perpendicular to the +y-axis and located in a −y-axis that is an opposite direction to the +y-axis direction. The controller 290 can stretch the entire display unit 250 by a stretch distance d3 in a +y-axis direction based on the obtained reference line A3. The stretch criterion is described as the edge of the display unit 250 in an embodiment of FIG. 5, but is not limited hereto and may be the surface of the display unit 250.

Figure 6:
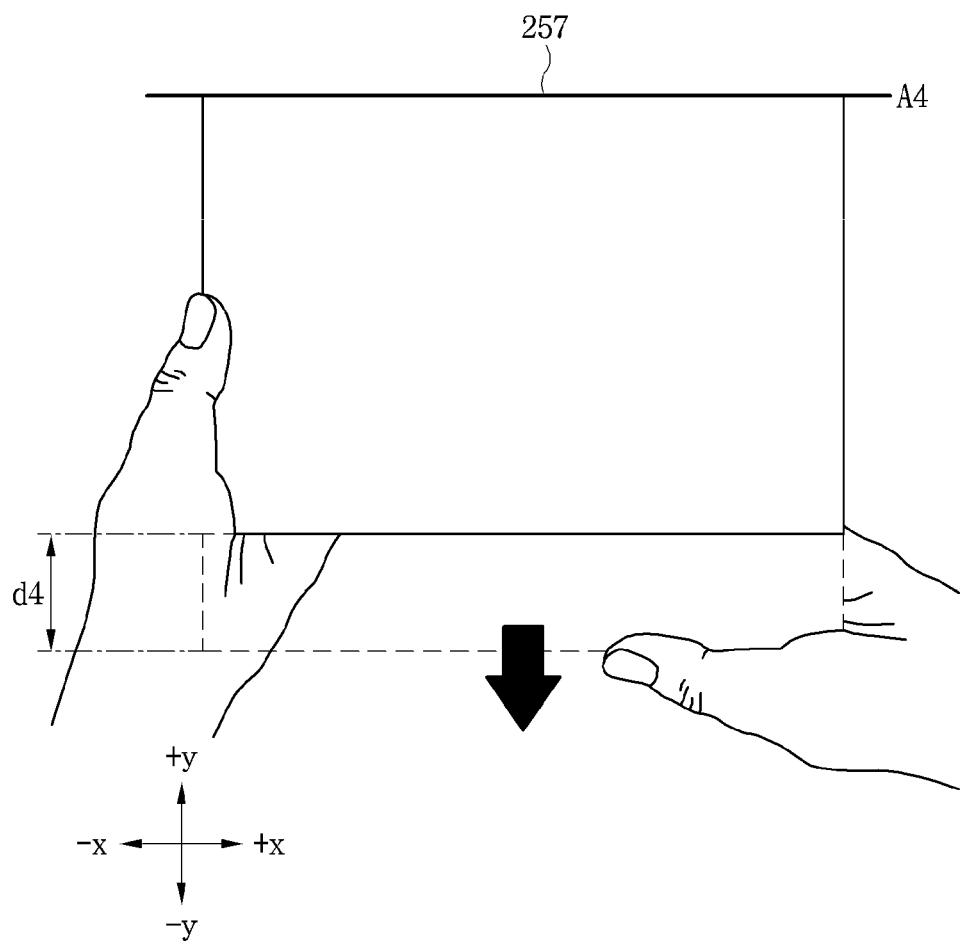

Next, description is provided with reference to FIG. 6. In particular, FIG. 6 is a view illustrating an example that the stretchable display unit is stretched when a force is applied in a −y-axis direction according to an embodiment. Referring to FIG. 6, the controller 290 can detect a force applied to the display unit 250 and check a direction of the detected force. When the direction of the detected force is a negative y-axis (−y-axis) direction, the controller 290 can obtain as a stretch criterion an edge or surface of the display unit 250 that is perpendicular and located in an opposite direction to −y-axis.

In more detail, when a force is applied in the −y-axis, the controller 290 can set to a reference line A3 a fourth edge 257 or an extension line of the fourth edge 257 of the display unit 250, which is perpendicular to and located in a +y-axis that is an opposite direction to the −y-axis direction. The controller 290 can stretch the entire display unit 250 by a stretch distance d4 in a −y-axis direction based on the set reference line A4. The stretch criterion is described as the edge of the display unit 250 in an embodiment of FIG. 6, but is not limited hereto and may be the surface of the display unit 250.

Figure 7:
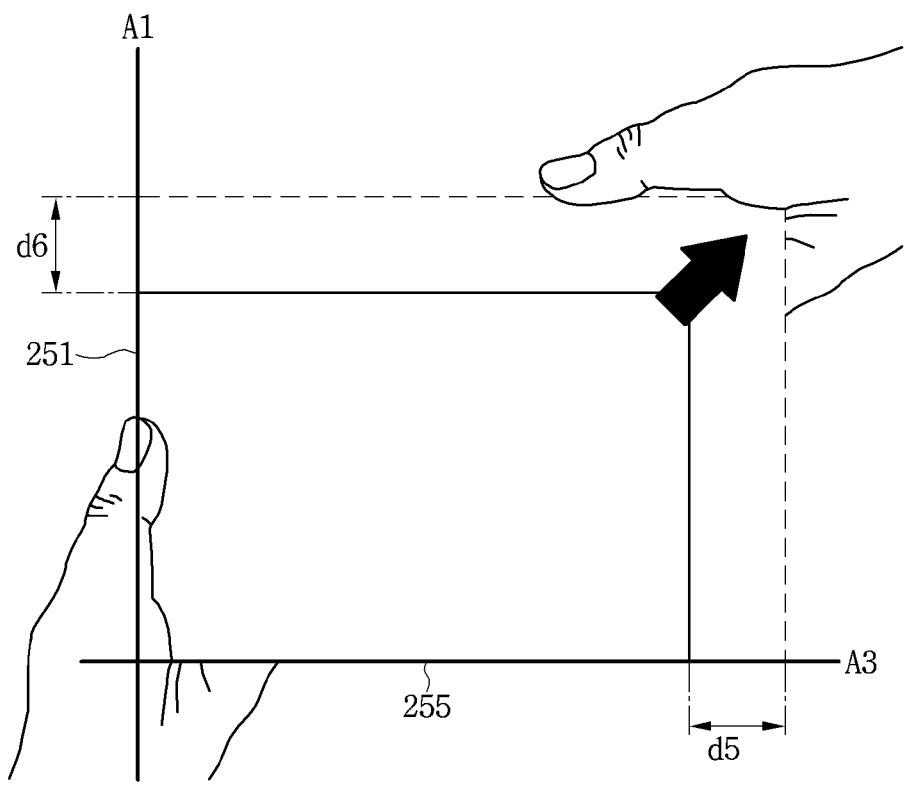

Next, description is provided with reference to FIG. 7. In particular, FIG. 7 is a view illustrating an example that the stretchable display unit is stretched when a force is simultaneously applied in +x-axis and +y-axis directions according to an embodiment. Referring to FIG. 7, the controller 290 can detect a force applied to the display unit 250 and check a direction of the detected force. When the detected force is in the +x axis and +y-axis directions (i.e., an upper diagonal direction), the controller 290 can obtain as the stretch criterion edges or surfaces of the display unit 250, which are perpendicular to and located in opposite directions to the +x-axis and +y-axis.

In more detail, when the force is applied in +x-axis and +y-axis directions, the controller 290 can set to the stretch criterion the extension line A1 of the first edge 251 and the extension line A3 of the third edge 255 of the display unit 250 located on the −x-axis and −y-axis that are respectively opposite to the +x-axis and +y-axis directions. The controller 290 can stretch the entire display unit 250 by a stretch distance d5 in the +x-axis and by a stretch distance d6 in the +y-axis based on the set stretch criterion. The stretch criterion is described as an edge of the display unit 250 in an embodiment of FIG. 7, but is not limited hereto and may be a surface of the display unit 250.

Figure 8:
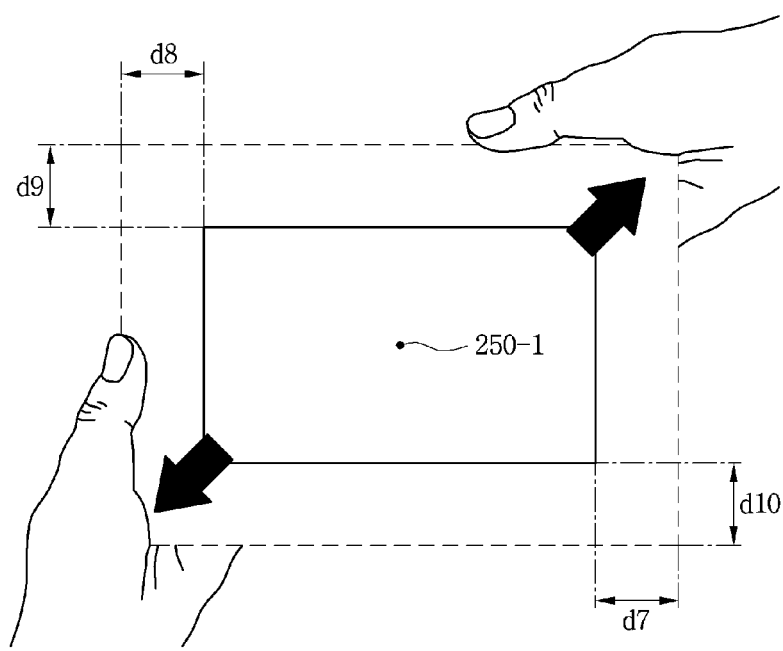

Next, description is provided with reference to FIG. 8. In particular, FIG. 8 is a view illustrating an example that the stretchable display unit is stretched when a force is simultaneously applied in +x-axis, −x-axis, +y-axis, and −y-axis directions according to an embodiment. Referring to FIG. 8, the controller 290 can detect a force applied to the display unit 250 and check a direction of the detected force. When the detected force is in the +x-axis, −x-axis, +y-axis, and −y-axis directions (i.e., upper and lower diagonal directions), the controller 290 can obtain the center point of the display unit 250 as the stretch criterion. The controller 290 can stretch the display unit 250 based on the center point of the display unit 250 by a stretch distance d7 in the +x-axis direction, a stretch distance d8 in the −x-axis direction, a stretch distance d9 in the +y-axis direction, and a stretch distance d10 in the −y-axis direction.

Figure 9:
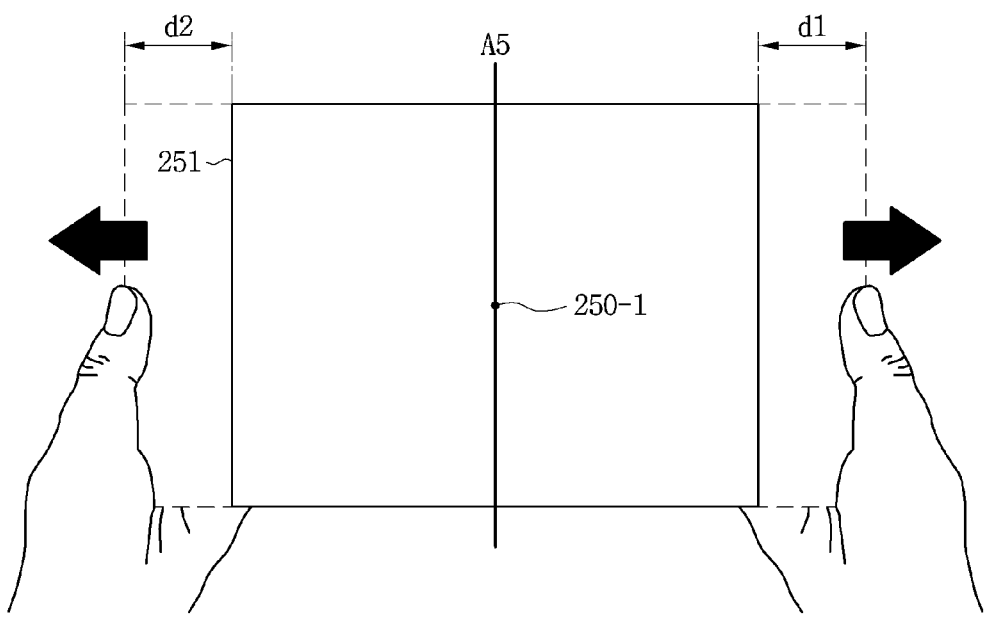

Next, description is provided with reference to FIG. 9. In particular, FIG. 9 is a view illustrating an example that the stretchable display unit is stretched when a force is simultaneously applied in +x-axis and −x-axis directions according to an embodiment. Referring to FIG. 9, the controller 290 can detect a force applied to the display unit 250 and check a direction of the detected force. When the detected direction of the force is in +x-axis and −x-axis directions, the controller 290 passes the center point of the display unit 250 and obtains as the stretch criterion a y-axis center line A5 perpendicular to the +x-axis and −x-axis directions. The controller 290 can stretch the entire area of display unit 250 by a stretch distance d1 in the +x-axis and a stretch distance d2 in the −x-axis based on the obtained stretch criterion.

Figure 10:
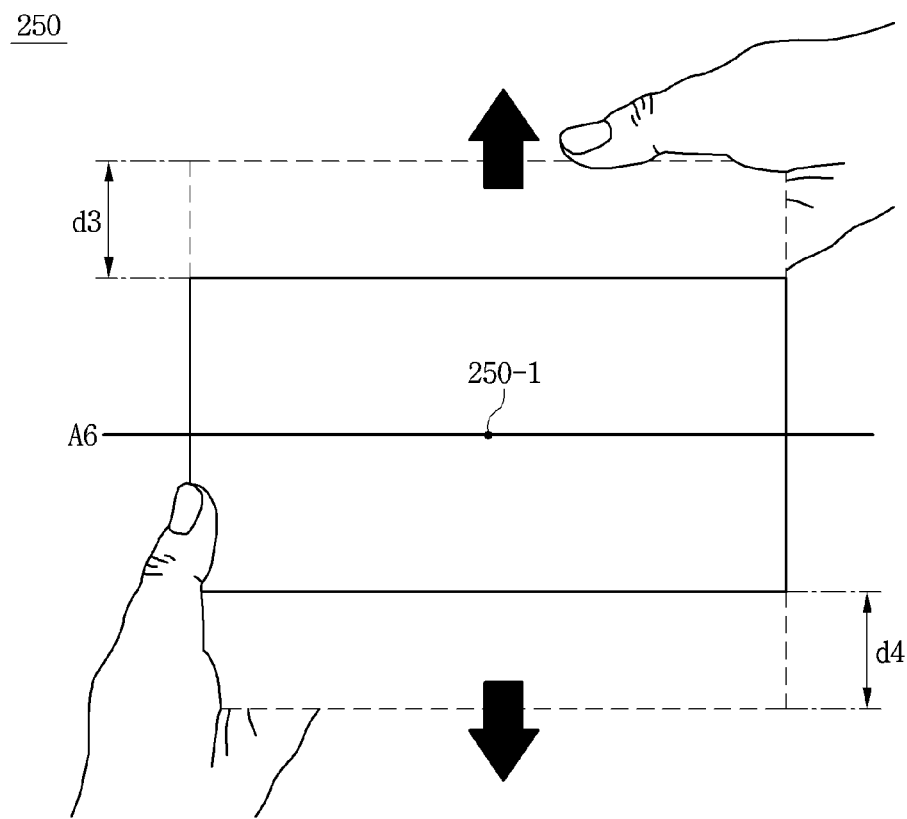

Next, description is provided with reference to FIG. 10. In particular, FIG. 10 is a view illustrating an example that the stretchable display unit is stretched when a force is simultaneously applied in +y-axis and −y-axis directions according to an embodiment. Referring to FIG. 10, the controller 290 can detect a force applied to the display unit 250 and check a direction of the detected force. When the detected direction of the force is in +y-axis and −y-axis directions, the controller 290 passes the center point of the display unit 250 and obtains as the stretch criterion a y-axis center line A5 perpendicular to the +y-axis and −y-axis directions. The controller 290 can stretch the entire display unit 250 by the stretch distance d3 in the +y-axis and a stretch distance d4 in the −y-axis based on the obtained stretch criterion.

Next, description is provided again with reference to FIG. 2. In particular, the controller 290 stretches the display unit 250 and controls the display unit 250 to display additional information on the stretched area (operation S109). In an embodiment, when a part of media content is displayed on the display unit 250 before stretch, the controller 290 can additionally display the media content as much as corresponding to the stretched area of the display unit 250. Descriptions about these will be provided with reference to FIGS. 11 and 12.

FIGS. 11(*a*) and 11(*b*) are views illustrating various examples illustrating information provided while the display unit is stretched according to a force applied to the display unit, when an area to be stretched is not designated in the entire area formed by the display unit. In particular, FIG. 11(*a*) illustrates the display unit 250 of the stretchable display device 200 before being stretched with media content displayed on the display unit 250. The media content may be any one of a video, image, and text, but this is just an example. The media content is assumed to be an image 301 and explained in FIGS. 11(*a*) and 11(*b*).

When the force is applied in the +x-axis direction in FIG. 11(*a*), the controller 290 can stretch the display unit 250 in the +x-axis direction by a specific area 303 corresponding to the stretch distance d1 based on the reference line A1. As the display unit 250 is stretched by the specific area 303, the controller 290 can control the display unit 250 so that a hidden area in an entire image 301 provided to the display unit 250 is displayed on the stretched specific area 303. The user can thus stretch the display unit 250 using only a force applied to the display unit 250 to easily view the image hidden by the display unit 250 before being stretched.

Next, description is provided with reference to FIGS. 12(*a*) and 12(*b*). In particular, FIG. 12(*a*) illustrates the display unit 250 of the stretchable display device 200 before being stretched. Description is provided by assuming that the text 305 is displayed on the display unit 250.

When the force is applied in the +x-axis direction in FIG. 12(*a*), the controller 290 can stretch the display unit 250 in the +x-axis direction by a specific area 303 corresponding to the stretch distance d1 based on the reference line A1. As the display unit 250 is stretched by the specific area 303, the controller 290 can control the display unit 250 so that a hidden part in an entire text 305 provided to the display unit 250 is displayed on the stretched specific area 303.

The user thus does not undergo inconvenience in reading the text by stretching the display unit 250 only with an operation of applying the force to the display unit 250 to view the hidden text on the display unit 250.

Next, description is provided again with reference to FIG. 2. The controller 290 obtains a force applied to the z-axis direction (operation S111) and zooms in or zooms out the media content provided on the display unit 250 according to the obtained force of the z-axis direction (operation S113).

Figure 13:
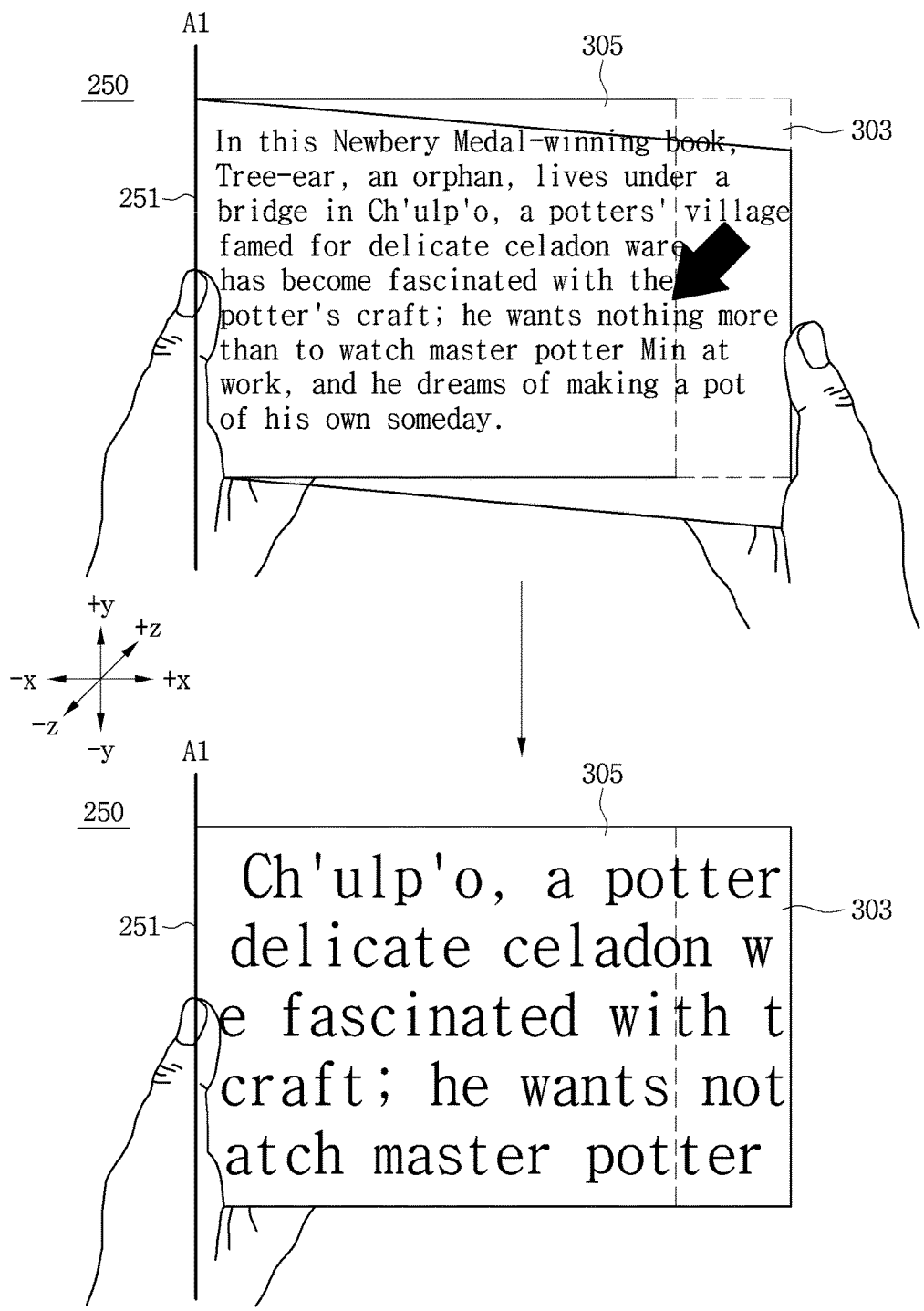
FIGS. 13 and 14 are views illustrating embodiments that when a direction of a force applied to a display unit is a z-axis direction, media contents provided on the display unit are zoomed in or zoomed out.
Figure 14:
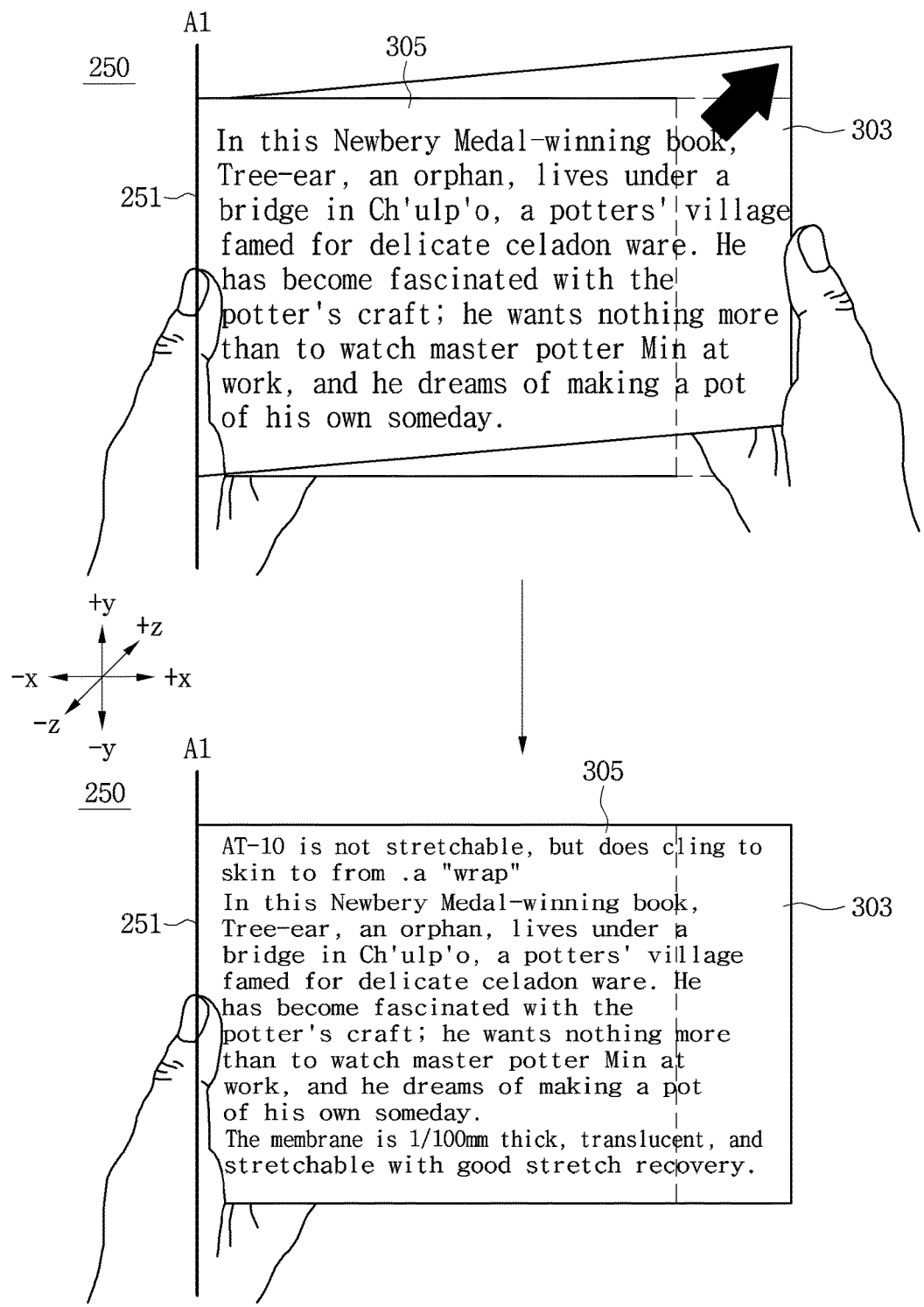

Descriptions about operations S111 and S113 will be provided with reference to FIGS. 13 and 14. In particular, FIGS. 13 and 14 are views illustrating an embodiment in which media content provided on the display unit is zoomed-in and zoomed-out when the direction of the force applied to the display unit is in the z-axis direction according to an embodiment.

FIGS. 13 and 14 use the embodiment described in relation to FIG. 12. In other words, the display unit 250 displays the text 305 and is assumed to be in a state of being stretched in the +x-axis by d1. First, description is provided in relation to FIG. 13. Referring to FIG. 13, the controller 290 can obtain a force applied in the −z-axis to the display unit 250 when the specific area 303 is stretched. The controller 290 can zoom-in the text 305 displayed on the display unit 250 in a stretched state according to the force applied in the −z-axis direction.

Next, description is provided in relation to FIG. 14. Referring to FIG. 14, the controller 290 can obtain a force applied in the +z-axis to the display unit 250 when the specific area 303 is stretched. The controller 290 can zoom-out the text 305 displayed on the display unit 250 in a stretched state according to the force applied in the +z-axis direction.

According to an embodiment, when a force for twisting the display unit 250 when the display unit 250 is stretched, the controller 290 can fix the display unit 250 in the stretched state. In embodiments of FIGS. 13 and 14, the −z-axis and +z-axis directions may be applied in a switched manner.

According to another embodiment, when the specific pressure is applied when the display unit 250 is stretched, the stretched state can be maintained. In addition, when an applied force disappears when the display unit 250 is stretched, the controller 290 can return the display unit 250 to a state before the stretch. Descriptions about this will be provided with reference to FIGS. 15 and 16.

Figure 16:
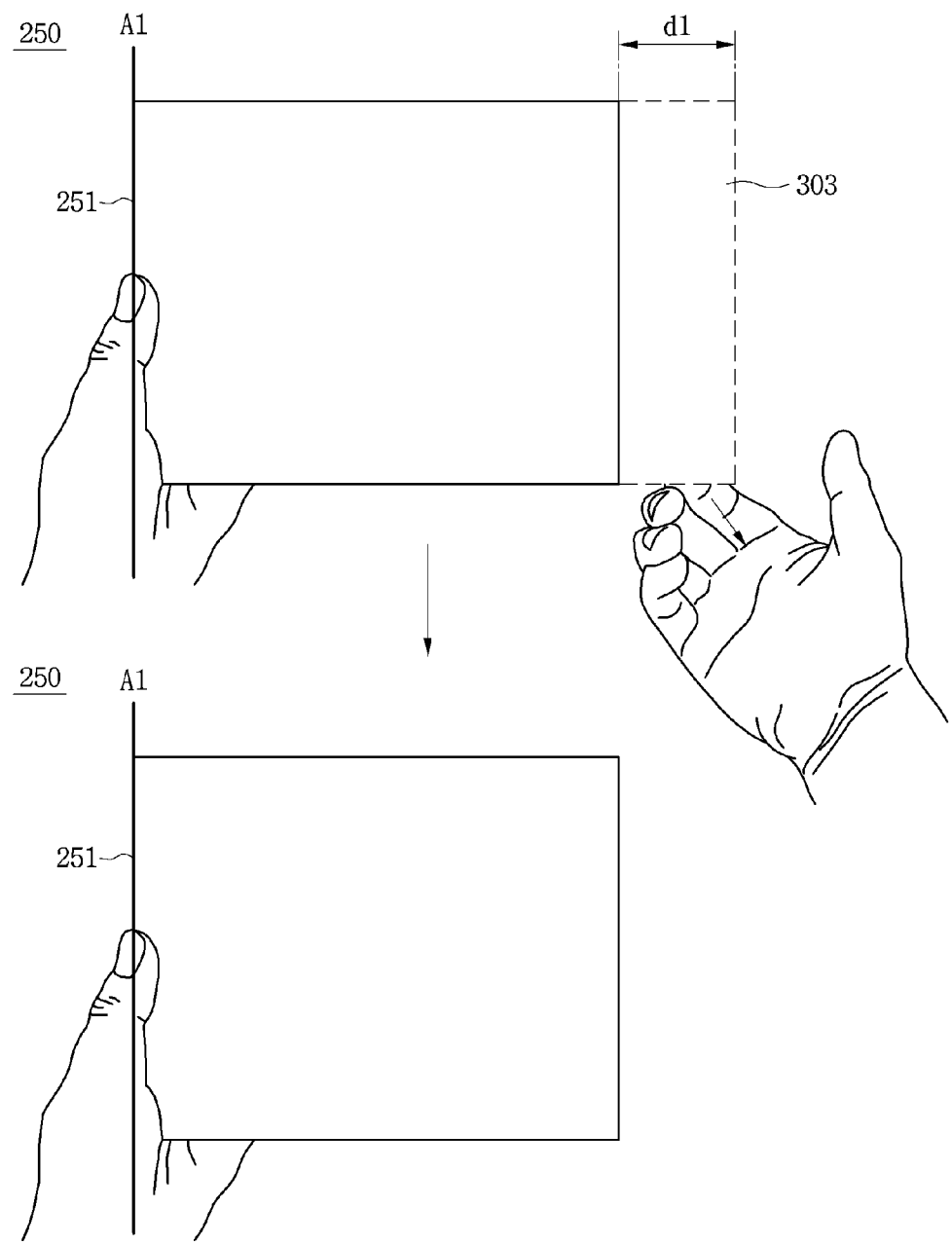

In particular, FIGS. 15 and 16 are views illustrating examples of fixing or returning to an original state the display unit in the stretched state according to various embodiments. The display unit 250 is assumed to be when the display unit 250 is stretched by the stretch distance d1 in the +x-direction in FIGS. 15 and 16.

First, a description is provided in relation to FIG. 15. Referring to FIG. 15, when a force is applied which allows the display unit 250 in the stretched state to be twisted, the controller 290 can fix the display unit 250 when the specific area 303 is stretched. The force for twisting the display unit 250 may include the +z direction force applied to one surface and −z-direction force applied to another surface of the display unit 250 at the same time. Thus, the user can fix the display unit 250 in the stretch state only with an operation for twisting the display unit 250 when the stretchable display device 200 is gripped with both hands.

Next, description is provided in relation to FIG. 16. Referring to FIG. 16, when the force applied in the −x-axis direction disappears when the display unit 250 is stretched, the controller 290 can return the display unit 250 in the stretched state to the display unit 250 before being stretched. For example, the user can stretch the display unit 250 by the specific area 303 by griping one surface of the display unit 250 with the left hand and applying the +x-axis direction force through the right hand. In this state, when the force applied in the +x-axis direction disappears (i.e., relaxing the right hand), the display 250 returns to the state before the stretch.

Next, description is provided again in relation to FIG. 2. Furthermore, when the area designation input is received in operation S101 (yes in S101), the controller 290 obtains the stretch criterion according to the received area designation input (operation S115). In an embodiment, the area designation input may be a touch input received through the display unit 250. The controller 290 can obtain the stretch criterion that is a criterion for stretching a partial area to be stretched in the entire area of the display unit 250 based on a touch point corresponding to the touch input. For example, the controller 290 can obtain as the stretch criterion an x-axis direction line passing the touch point and a y-axis direction line passing the touch point.

In another embodiment, the area designation input may be an input for selecting a specific content item among one or more content items displayed on the display unit 250. In another embodiment, the area designation input may be a touch pen input for designating an area through a touch pen on the display unit 250. In still another embodiment, the area designation input may be an input through which a force bending the display unit 250 is applied. A description about an embodiment in which the stretch criterion is obtained according to the area designation input will be described later.

The controller 290 checks a direction of the force applied to the display unit (operation S117), and stretches a part of the entire area of the display unit in the checked direction of the force based on the obtained stretch criterion (operation S119). The controller 290 can enlarge media content displayed on the partial area or control the display unit 250 to display additional information (operation S121).

Hereinafter, operations S115 to S121 will be described in detail. In particular, FIGS. 17 to 28 are views illustrating embodiments that the display unit is stretched base on an obtained stretch criterion when the area designation input is a touch input according to various embodiments.

Figure 17:
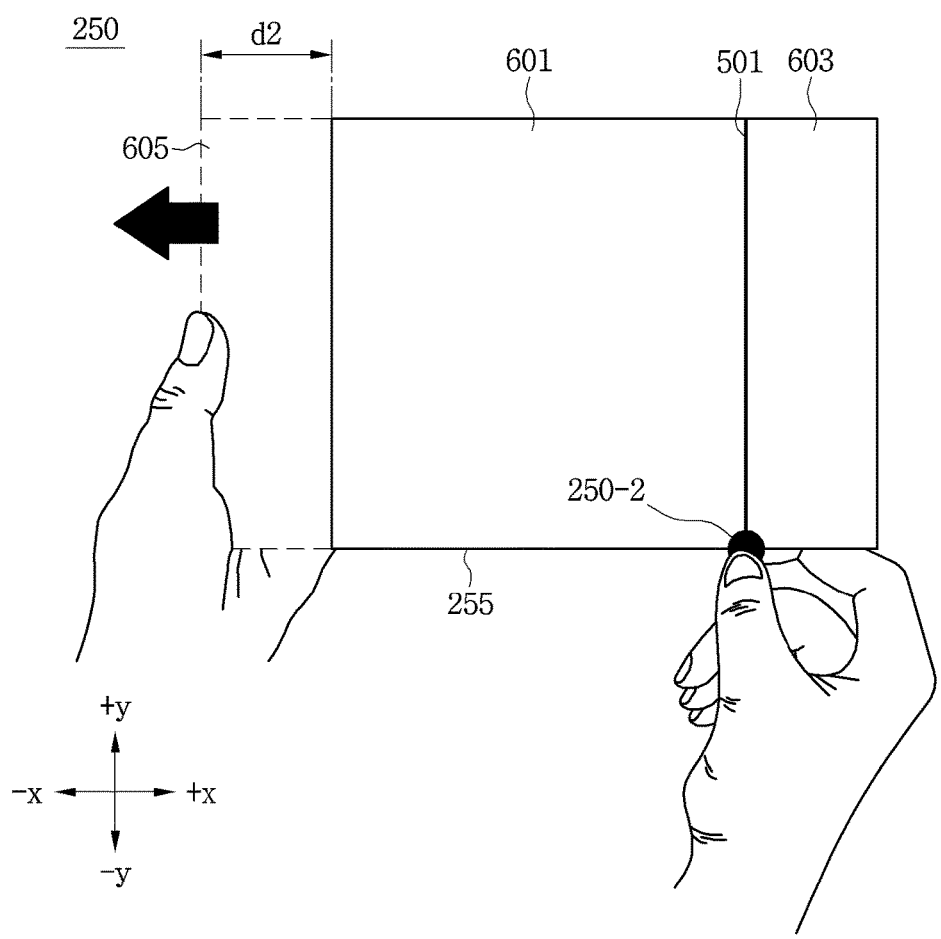
FIGS. 17 to 28 are views illustrating embodiments that when an area designation input is a touch input, a display unit is stretched based on an obtained stretch criterion according to various embodiments.

First, referring to FIG. 17, the controller 290 can receive a touch input for area designation at one point (e.g., the touch point 250-2) on a third corner 255 of the display unit 250. The controller 290 can obtain the stretch criterion based on the touch point 250-2 corresponding to the received touch input. The controller 290 can display the y-axis direction line 501 in the y-axis direction perpendicular to the touch point 250-2 on the display unit 250. The y-axis direction line 501 may be the stretch criterion for distinguishing an area to be stretched in the entire area of the display unit 250.

As shown, the entire area formed by the display unit 250 may include a first area 601 disposed in the −x-axis direction and a second area 603 disposed in +x-axis direction based on the y-axis direction line 501. When the force is applied in the −x-axis direction to the display unit 250, the controller 290 can stretch only the first area 601 of the entire area of the display unit 250 by the specific area 605 having the stretch distance d2 in the −x-axis direction. In other words, the controller 290 can control the display unit 250 so that although the force is applied to the display unit 250 in the −x-axis direction, the second area 603 is fixed without stretch.

When the force is applied to the display unit 250 in the +x-axis direction, the controller 290 can stretch only the second area 603 of the entire area of the display unit 250 in the +x-axis direction by a specific area. Furthermore, information not displayed on the first area 601 that is a stretch target can be provided to the stretched specific area 605 of the display unit 250. In addition, as the display unit 250 is stretched, information displayed on the first area 601 can be enlarged and displayed. Descriptions about this will be provided with reference to FIGS. 18 and 19.

Figure 18:
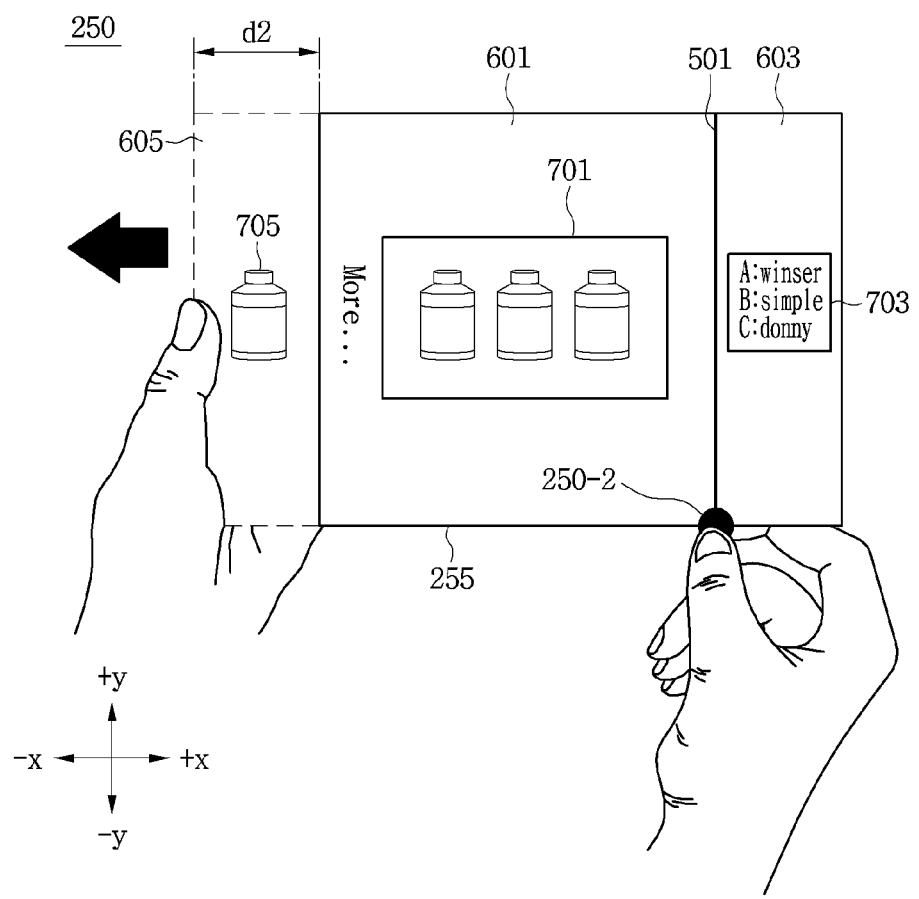
Figure 19:
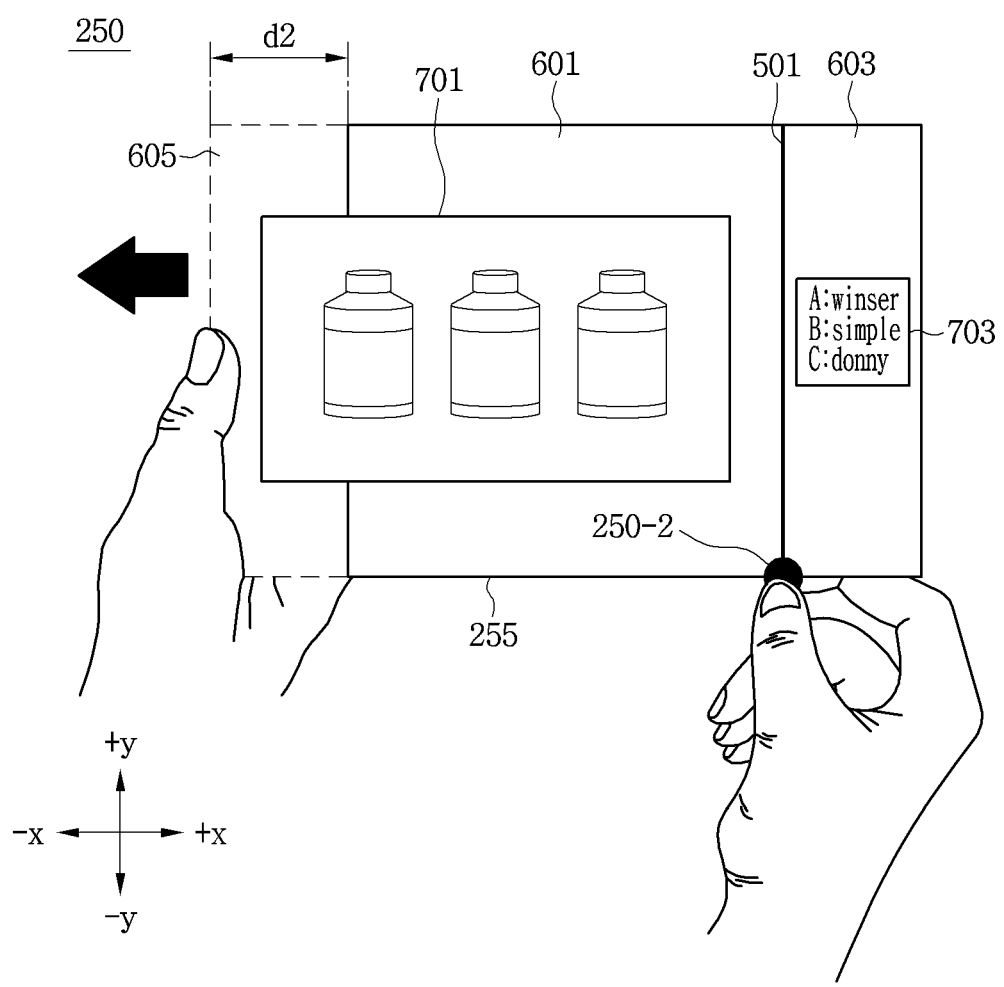

Description in relation to FIGS. 18 and 19 will be provided based on an embodiment of FIG. 17. First, FIG. 18 is a view illustrating an embodiment providing additional information to the stretched specific area according to an embodiment. Referring to FIG. 18, a product list 701 including a plurality of product images and detailed description 703 about the products are respectively displayed in the first area 601 and the second area 603 of the display unit 250. When the force is applied to the display unit in −x-axis direction, the controller 290 can stretch the first area 601 by the specific area 605 based on the y-axis direction line 501. The controller 290 can control the display unit 250 so that a product image 705 hidden by the screen size of the first area 601 on the stretched specific area 605 is additionally displayed.

Next, description is provided in relation to FIG. 19. In particular, FIG. 19 is a view illustrating an embodiment in which information is enlarged and displayed according to the stretch of the display unit by a specific area according to an embodiment. Referring to FIG. 19, the product list 701 including a plurality of product images and detailed description 703 about the products are respectively displayed in the first area 601 and the second area 603 of the display unit 250. When the force is applied to the display unit in −x-axis direction, the controller 290 can stretch the first area 601 by the specific area 605 based on the y-axis direction line 501. The controller 290 can control the display unit 250 so that the product list 701 displayed in the first area 601 is enlarged and displayed according to the stretch of the display unit 250 by the specific area 605.

Figure 20:
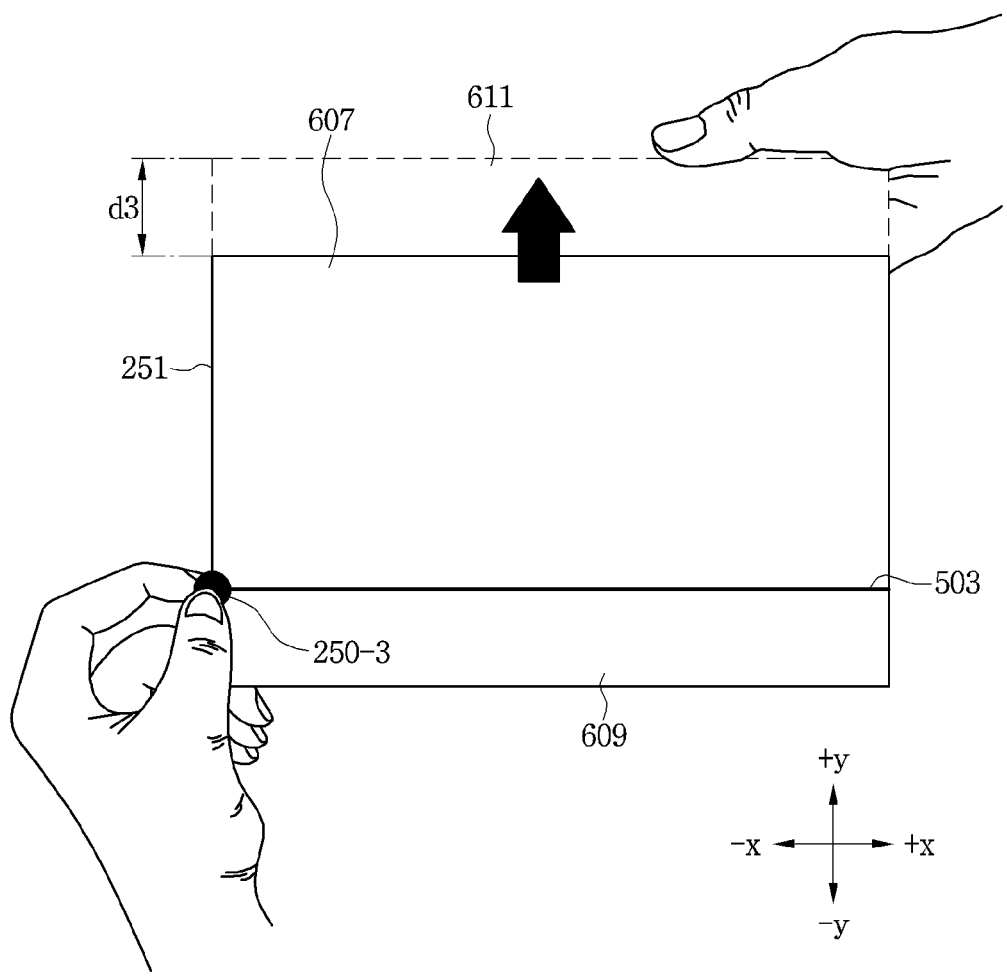

Next, description is provided in relation to FIG. 20. Referring to FIG. 20, the controller 290 can receive a touch input for area designation in one point (e.g., the touch point 250-3) on a first corner 251 of the display unit 250. The controller 290 can obtain the stretch criterion based on the touch point 250-3 corresponding to the received touch input. The controller 290 can display the x-axis direction line 503 in the x-axis direction horizontal to the touch point 250-3 on the display unit 250. The x-axis direction line 503 may be the stretch criterion for distinguishing an area to be stretched in the entire area of the display unit 250.

The entire area formed by the display unit 250 may include a third area 607 disposed in the +y-axis direction and a fourth area 609 disposed in −y-axis direction based on the x-axis direction line 503. When the force is applied in the +y-axis direction to the display unit 250, the controller 290 can stretch only the third area 607 of the entire area of the display unit 250 by a specific area 611 having the stretch distance d3 in the +y-axis direction.

In other words, the controller 290 can control the display unit 250 so that although the force is applied to the display unit 250 in the +y-axis direction, the fourth area 609 is fixed without the stretch. When the force is applied to the display unit 250 in the −y-axis direction, the controller 290 can stretch only the fourth area 609 of the entire area of the display unit 250 in the −y-axis direction by a specific area.

Figure 21:
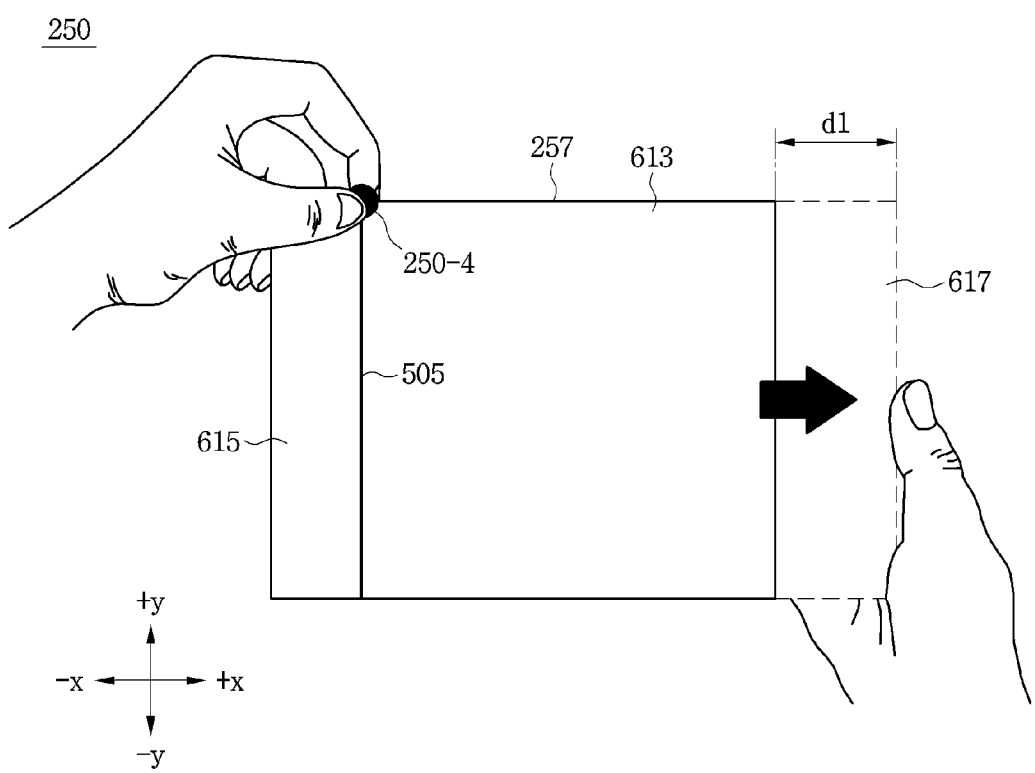

Next, description is provided in relation to FIG. 21. Referring to FIG. 21, the controller 290 can receive a touch input for area designation in one point (e.g., the touch point 250-4) on a fourth corner 257 of the display unit 250. The controller 290 can obtain the stretch criterion based on the touch point 250-4 corresponding to the received touch input. The controller 290 can display the y-axis direction line 505 in the y-axis direction perpendicular to the touch point 250-4 on the display unit 250. The y-axis direction line 505 may be the stretch criterion for distinguishing an area to be stretched in the entire area of the display unit 250.

The entire area formed by the display unit 250 may include a fifth area 613 disposed in the +x-axis direction and a sixth area 615 disposed in −x-axis direction based on the y-axis direction line 505.

When the force is applied in the +x-axis direction to the display unit 250, the controller 290 can stretch only the fifth area 613 of the entire area of the display unit 250 by a specific area 617 having the stretch distance d3 in the +x-axis direction. In other words, the controller 290 can control the display unit 250 so that although the force is applied to the display unit 250 in the +x-axis direction, the second sixth area 615 is fixed without the stretch. When the force is applied to the display unit 250 in the −x-axis direction, the controller 290 can stretch only the sixth area 615 in the entire area of the display unit 250 in the −x-axis direction by a specific area.

Figure 22:
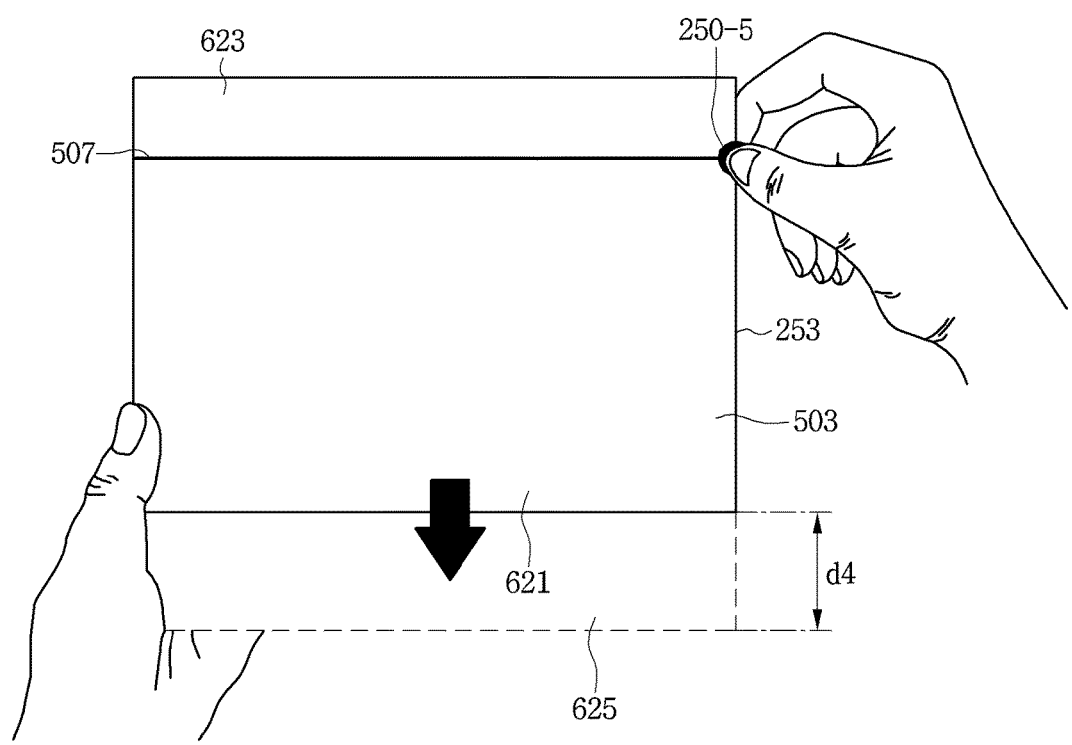

Next, description is provided in relation to FIG. 22. Referring to FIG. 22, the controller 290 can receive a touch input for area designation in one point (e.g., the touch point 250-5) on a second corner 253 of the display unit 255. The controller 290 can obtain the stretch criterion based on the touch point 250-5 corresponding to the received touch input. The controller 290 can display the x-axis direction line 507 in the x-axis direction horizontal to the touch point 250-5 on the display unit 250. The x-axis direction line 507 may be the stretch criterion for distinguishing an area to be stretched in the entire area of the display unit 250.

The entire area formed by the display unit 250 may include a seventh area 621 disposed in the −y-axis direction and an eighth area 623 disposed in +y-axis direction based on the x-axis direction line 507.

When the force is applied in the −y-axis direction to the display unit 250, the controller 290 can stretch only the seventh area 621 in the entire area of the display unit 250 by a specific area 625 having the stretch distance d4 in the −y-axis direction. In other words, the controller 290 can control the display unit 250 so that although the force is applied to the display unit 250 in the −y-axis direction, the eighth area 623 is fixed without the stretch. When the force is applied to the display unit 250 in the +y-axis direction, the controller 290 can stretch only the eighth area 623 of the entire area of the display unit 250 in the +y-axis direction by a specific area.

Figure 23:
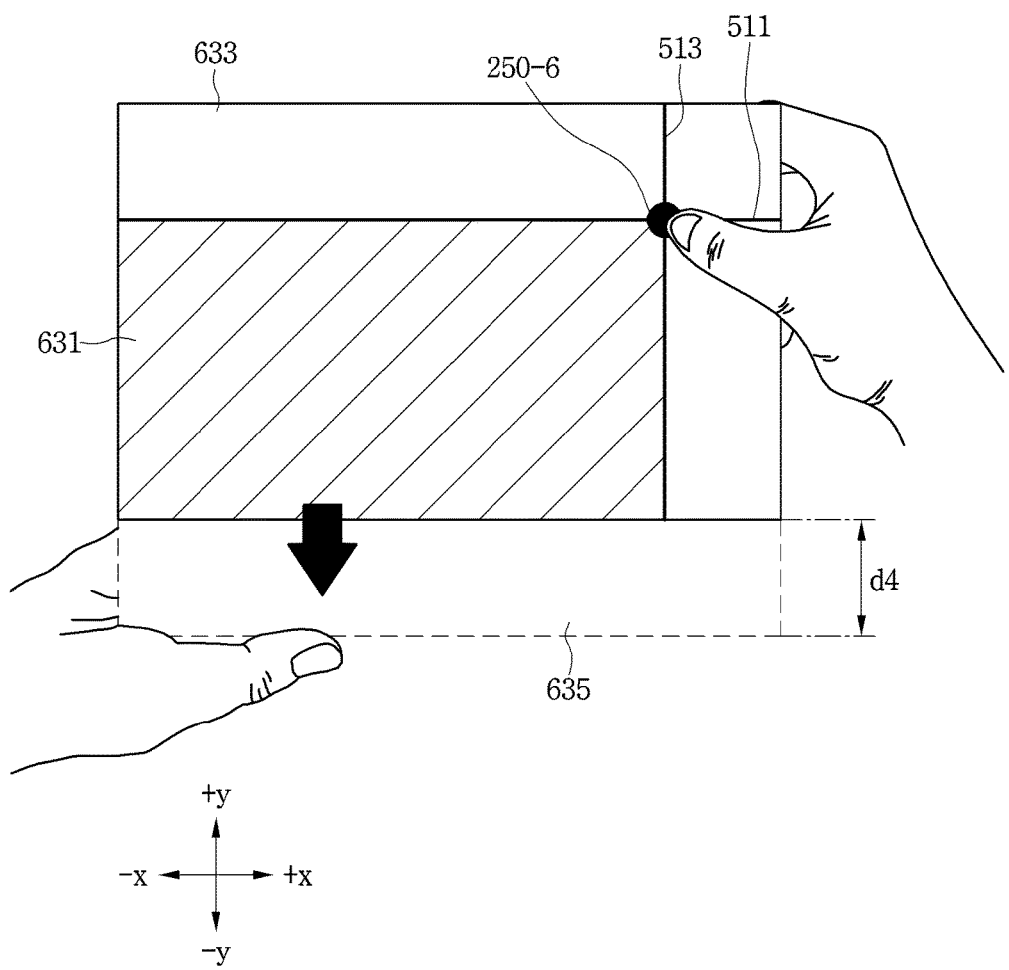

Next, description is provided in relation to FIG. 23. Referring to FIG. 23, the controller 290 can receive a touch input for area designation in one point (e.g., a touch point 250-6) on the display unit 250. The controller 290 can obtain the stretch criterion based on the touch point 250-6 corresponding to the received touch input. The controller 290 can display the x-axis and y-axis direction lines 511 and 513 passing the touch point 250-6 on the display unit 250.

The x-axis direction line 511 may be the stretch criterion for distinguishing an area to be stretched in the entire area of the display unit 250. In addition, the x-axis and y-axis direction lines 511 and 513 may be a criterion for enlarging media content displayed in a partial area of the entire area of the display unit 250 and additionally providing hidden information not display in the part area.

The entire area formed by the display unit 250 may include a designation area 631 and a non-designation area 633 based on the x-axis and y-axis direction lines 511 and 513. The designation area 631 may be an area for enlarging media content displayed in the designation area 631 or additionally providing hidden information among information displayed in the designation area 631 according to the stretch of the display unit 250. The designation area 631 is indicated with a diagonal line and the non-designation area 633 is indicated without the diagonal line.

When the force is applied to the display unit 250 in the −y-axis direction, the controller 290 can stretch only an area positioned in the −y-axis direction based on the x-axis direction lines 511 in the entire area of the display unit 250. Accordingly the display unit 250 may be stretched in the −y-axis direction by a specific area 635 having a stretch distance d4. The controller 290 can enlarge media content displayed in the designation area 631 or display information hidden and not displayed on the designation area 631 as a partial area of the display unit 250 is stretched. Description about this will be described with reference to FIG. 24.

Figure 24:
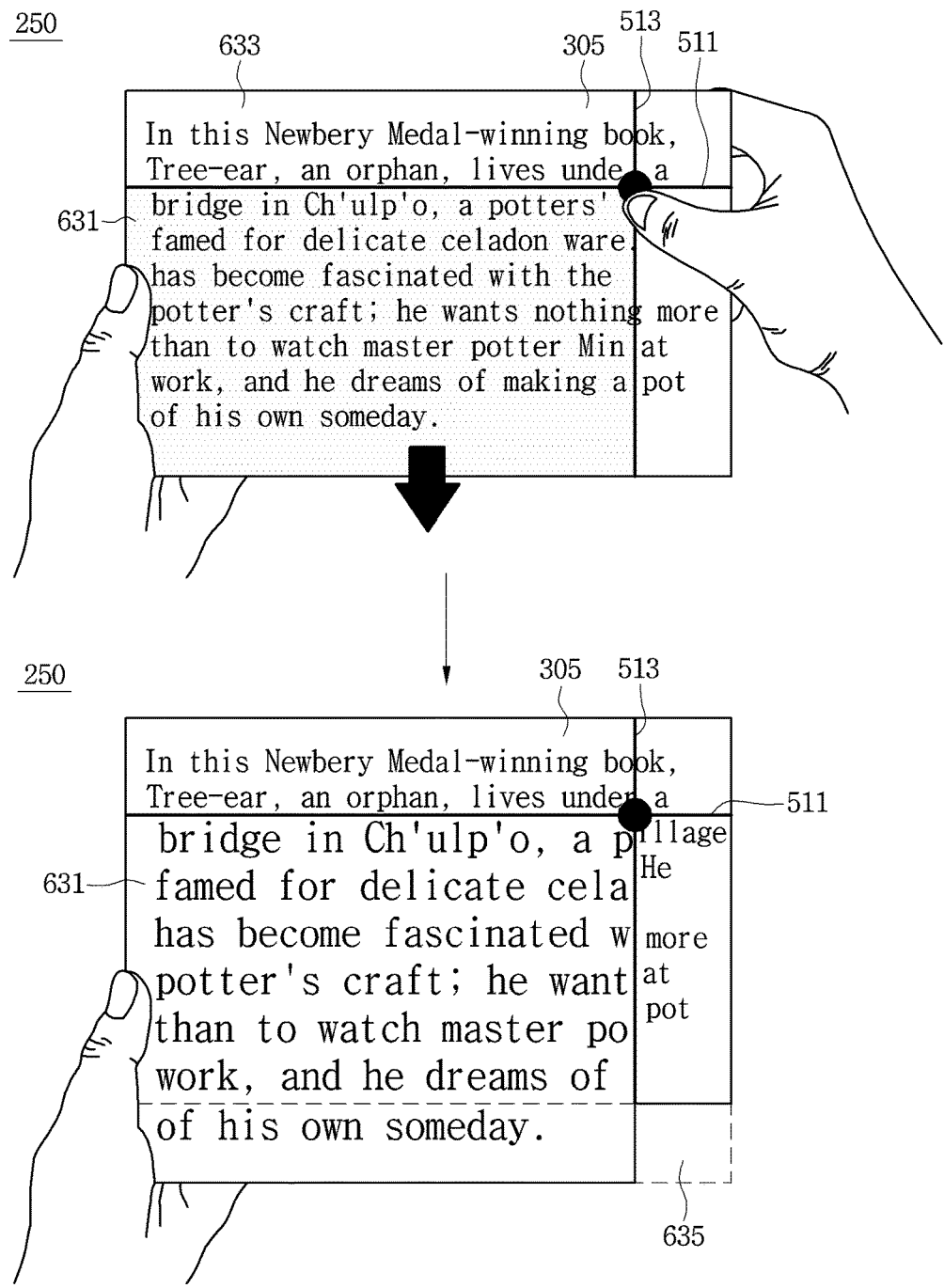

FIG. 24 is assumed to be based on the embodiment of FIG. 23. Referring to FIG. 24, the text 305 is displayed on the display unit 250. When the force is applied to the display unit 250 in the −y-axis direction, the controller 290 can stretch only an area positioned in the −y-axis direction based on the x-axis direction lines 511 in the entire area of the display unit 250. The controller 290 can control the display unit 250 to enlarge and display only the text displayed on the designation area 631 as the stretch of a partial area of the display unit 250. In other words, the controller 290 can control the display unit to fix the size of the text displayed in the non-designation area 633 and enlarge to display only the text displayed in the designation area 631.

Figure 25:
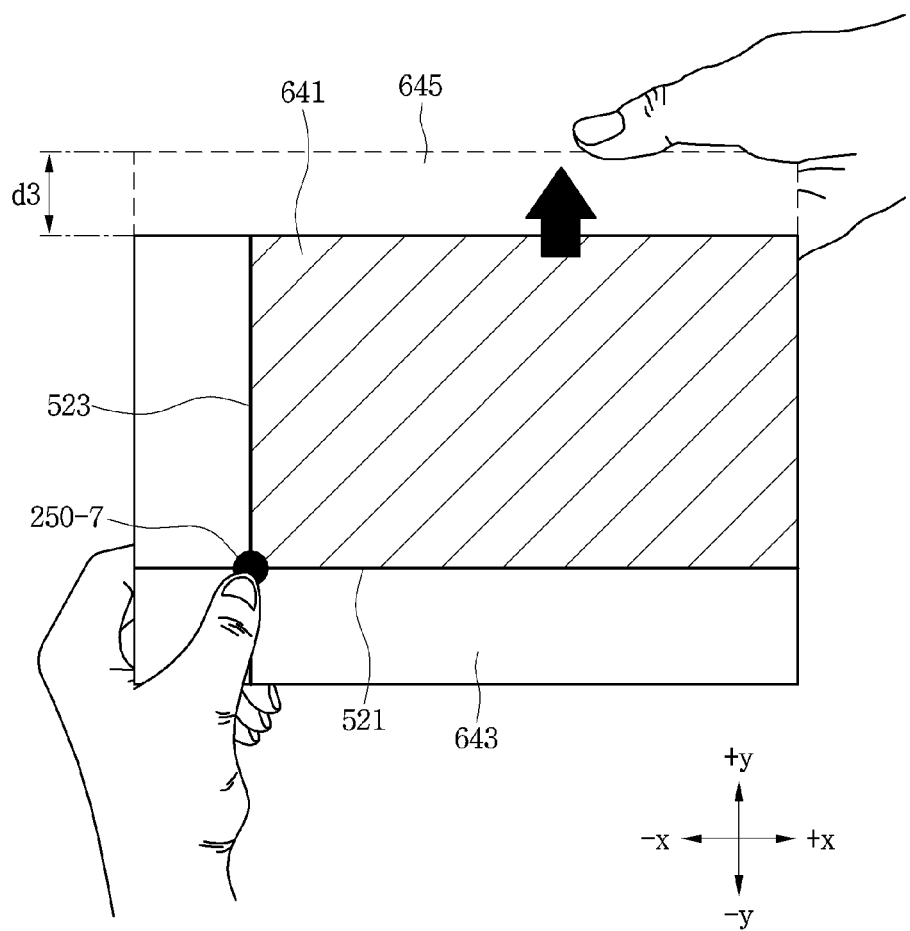

Next, description is provided in relation to FIG. 25. Referring to FIG. 25, the controller 290 can receive a touch input for area designation in one point (e.g., a touch point 250-7) on the display unit 250. The controller 290 can obtain the stretch criterion based on the touch point 250-7 corresponding to the received touch input. The controller 290 can display the x-axis and y-axis direction lines 521 and 523 passing the touch point 250-7 on the display unit 250. The x-axis direction line 521 may be the stretch criterion for distinguishing an area to be stretched in the entire area of the display unit 250. In addition, the x-axis and y-axis direction lines 521 and 523 may be a criterion for enlarging media content displayed in a partial area of the entire area of the display unit 250 and additionally providing hidden and not displayed information in the part area.

The entire area formed by the display unit 250 may include a designation area 641 and a non-designation area 643 based on the x-axis and y-axis direction lines 521 and 523. The designation area 641 may be an area for enlarging media content displayed in the designation area 641 or additionally providing the hidden information among information displayed in the designation area 641 according to the stretch of the display unit 250. The designation area 641 is indicated with a diagonal line and the non-designation area 643 is indicated without the diagonal line.

When the force is applied to the display unit 250 in the +y-axis direction, the controller 290 can stretch only an area positioned in the +y-axis direction based on the x-axis direction lines 521 in the entire area of the display unit 250. Accordingly the display unit 250 may be stretched in the +y-axis direction by a specific area 645 having the stretch distance d3. The controller 290 can enlarge media content displayed in the designation area 641 or display information hidden and not displayed in the designation area 641 as a partial area of the display unit 250 is stretched.

Figure 26:
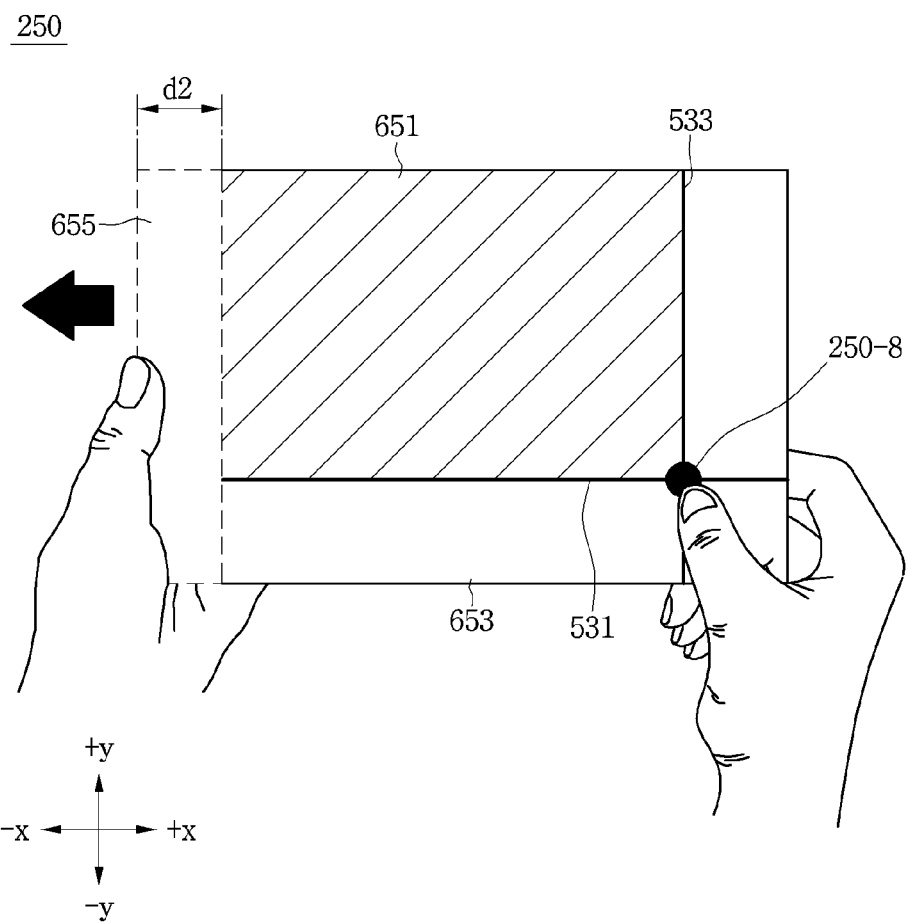

Next, description is provided in relation to FIG. 26. Referring to FIG. 26, the controller 290 can receive a touch input for area designation in one point (e.g., a touch point 250-8) on the display unit 250. The controller 290 can obtain the stretch criterion based on the touch point 250-8 corresponding to the received touch input. The controller 290 can display the x-axis and y-axis direction lines 531 and 533 passing the touch point 250-8 on the display unit 250. The y-axis direction line 533 may be the stretch criterion for distinguishing an area to be stretched in the entire area of the display unit 250. In addition, the x-axis and y-axis direction lines 531 and 533 may be a criterion for enlarging media content displayed in a partial area in the entire area of the display unit 250 and additionally providing hidden and not displayed information in the partial area.

The entire area formed by the display unit 250 may include the designation area 651 and the non-designation area 653 based on the x-axis and y-axis direction lines 531 and 533. The designation area 651 may be an area for enlarging media content displayed in the designation area 651 or additionally providing the hidden information among information displayed in the designation area 651 according to the stretch of the display unit 250. The designation area 651 is indicated with a diagonal line and the non-designation area 653 is indicated without the diagonal line.

When the force is applied to the display unit 250 in the −x-axis direction, the controller 290 can stretch only an area positioned in the −x-axis direction based on the y-axis direction line 533 in the entire area of the display unit 250. Accordingly the display unit 250 may be stretched in the −x-axis direction by a specific area 655 having the stretch distance d2. The controller 290 can enlarge media content displayed in the designation area 651 or display information hidden and not displayed in the designation area 651 as a partial area of the display unit 250 is stretched.

Figure 27:
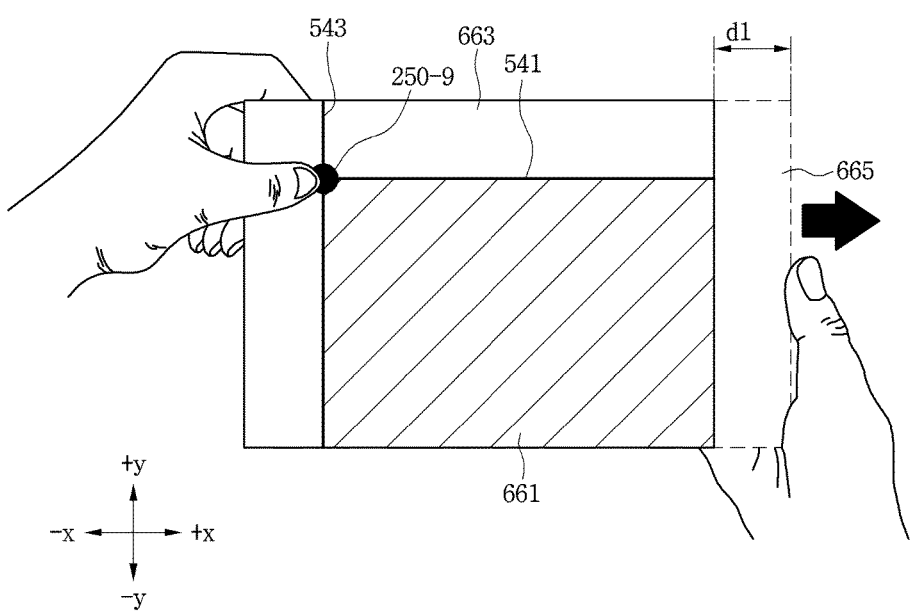

Next, description is provided in relation to FIG. 27. Referring to FIG. 27, the controller 290 can receive a touch input for area designation in one point (e.g., a touch point 250-9) on the display unit 250. The controller 290 can obtain the stretch criterion based on the touch point 250-9 corresponding to the received touch input. The controller 290 can display the x-axis and y-axis direction lines 541 and 543 passing the touch point 250-9 on the display unit 250. The y-axis direction line 543 may be the stretch criterion for distinguishing an area to be stretched in the entire area of the display unit 250. In addition, the x-axis and y-axis direction lines 541 and 543 may be a criterion for enlarging media content displayed in a partial area of the entire area of the display unit 250 and additionally providing hidden and not displayed information in the partial area.

The entire area formed by the display unit 250 may include the designation area 661 and the non-designation area 663 based on the x-axis and y-axis direction lines 541 and 543. The designation area 661 may be an area for enlarging media content displayed in the designation area 661 or additionally providing the hidden information among information displayed in the designation area 661 according to the stretch of the display unit 250. The designation area 661 is indicated with a diagonal line and the non-designation area 663 is indicated without the diagonal line.

When the force is applied to the display unit 250 in the +x-axis direction, the controller 290 can stretch only an area positioned in the +x-axis direction based on the y-axis direction line 543 in the entire area of the display unit 250. Accordingly the display unit 250 may be stretched in the +x-axis direction by a specific area 665 having the stretch distance d1. The controller 290 can enlarge media content displayed in the designation area 661 or display information hidden and not displayed in the designation area 661 according to the stretch of a partial area of the display unit 250.

Figure 28:
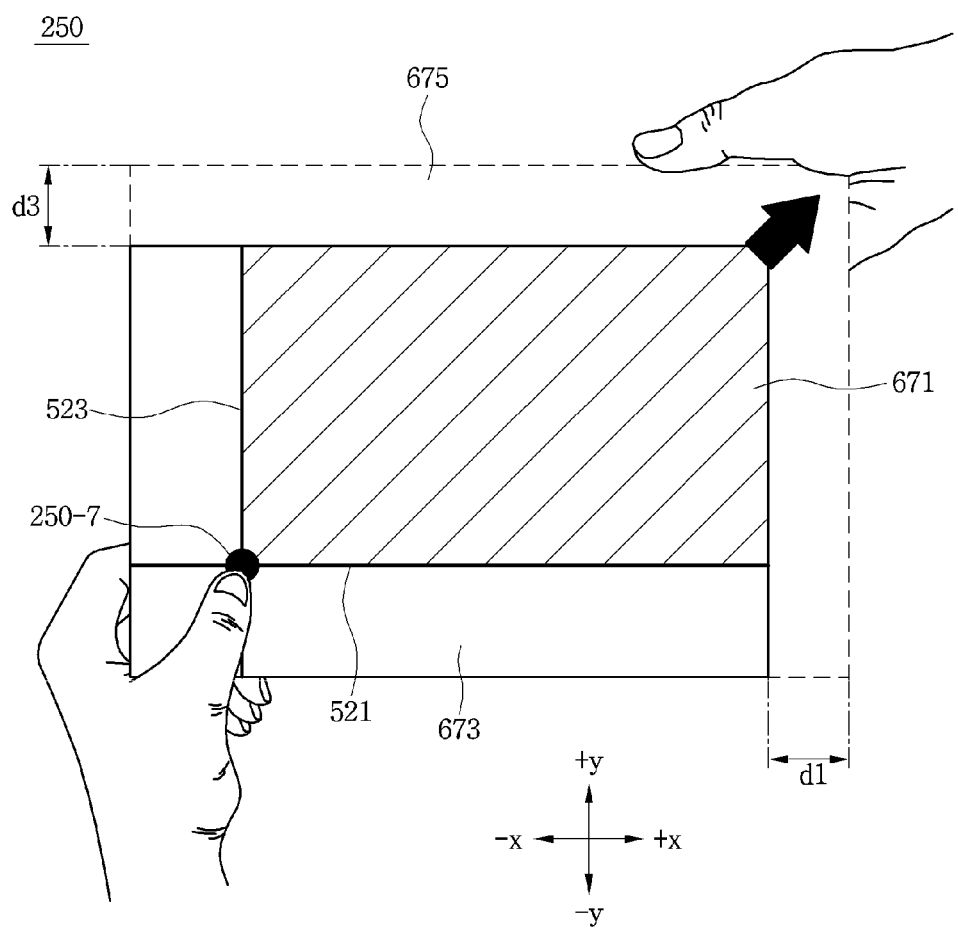

Next, description is provided in relation to FIG. 28. Referring to FIG. 28, the controller 290 can receive a touch input for area designation in one point (e.g., a touch point 250-7) on the display unit 250. The controller 290 can obtain the stretch criterion based on the touch point 250-7 corresponding to the received touch input. The controller 290 can display the x-axis and y-axis direction lines 521 and 523 passing the touch point 250-7 on the display unit 250. The x-axis and y-axis direction lines 521 and 523 may be the stretch criterion for distinguishing an area to be stretched in the entire area of the display unit 250. In addition, the x-axis and y-axis direction lines 521 and 523 may be a criterion for enlarging media content displayed in a partial area of the entire area of the display unit 250 and additionally providing hidden and not displayed information in the partial area.

The entire area formed by the display unit 250 may include the designation area 671 and the non-designation area 673 based on the x-axis and y-axis direction lines 521 and 523. The designation area 671 may be an area for enlarging media content displayed in the designation area 671 or additionally providing the hidden information among information displayed in the designation area 671 according to the stretch of the display unit 250. The designation area 671 is indicated with a diagonal line and the non-designation area 673 is indicated without the diagonal line.

When the force is applied to the display unit 250 in the +x-axis and +y-axis directions, the controller 290 can stretch only an area positioned in the +y-axis direction based on the x-axis direction line 521 and in the +x-axis direction based on the y-axis direction line 523 in the entire area of the display unit 250. Accordingly the display unit 250 may be stretched in the +x-axis direction by the specific area 675 having the stretch distance d3 in the +y-axis direction. The controller 290 can enlarge media content displayed in the designation area 671 or display information hidden and not displayed in the designation area 671 according to the stretch of a partial area of the display unit 250.

According to another embodiment, a specific content item may be selected among one or more content items displayed in the display unit 250 and the selected content item may be enlarged when the display unit 250 is stretched. Descriptions about this will be provided with reference to FIGS. 29 and 30.

Figure 29:
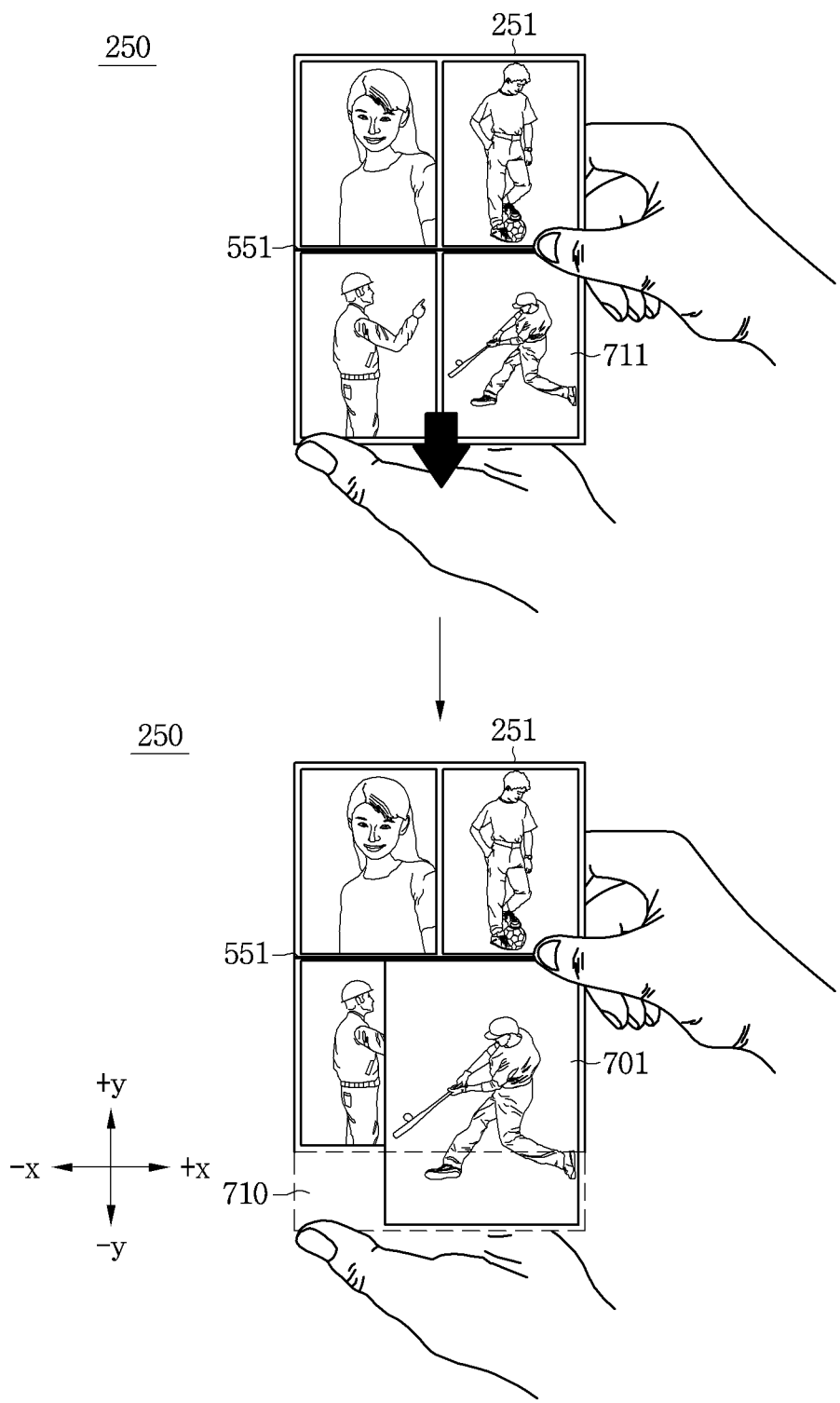
FIGS. 29 to 30 are views illustrating embodiments that when an area designation input is an input for selecting a content item, a display unit is stretched based on an obtained stretch criterion according to various embodiments.
Figure 30:
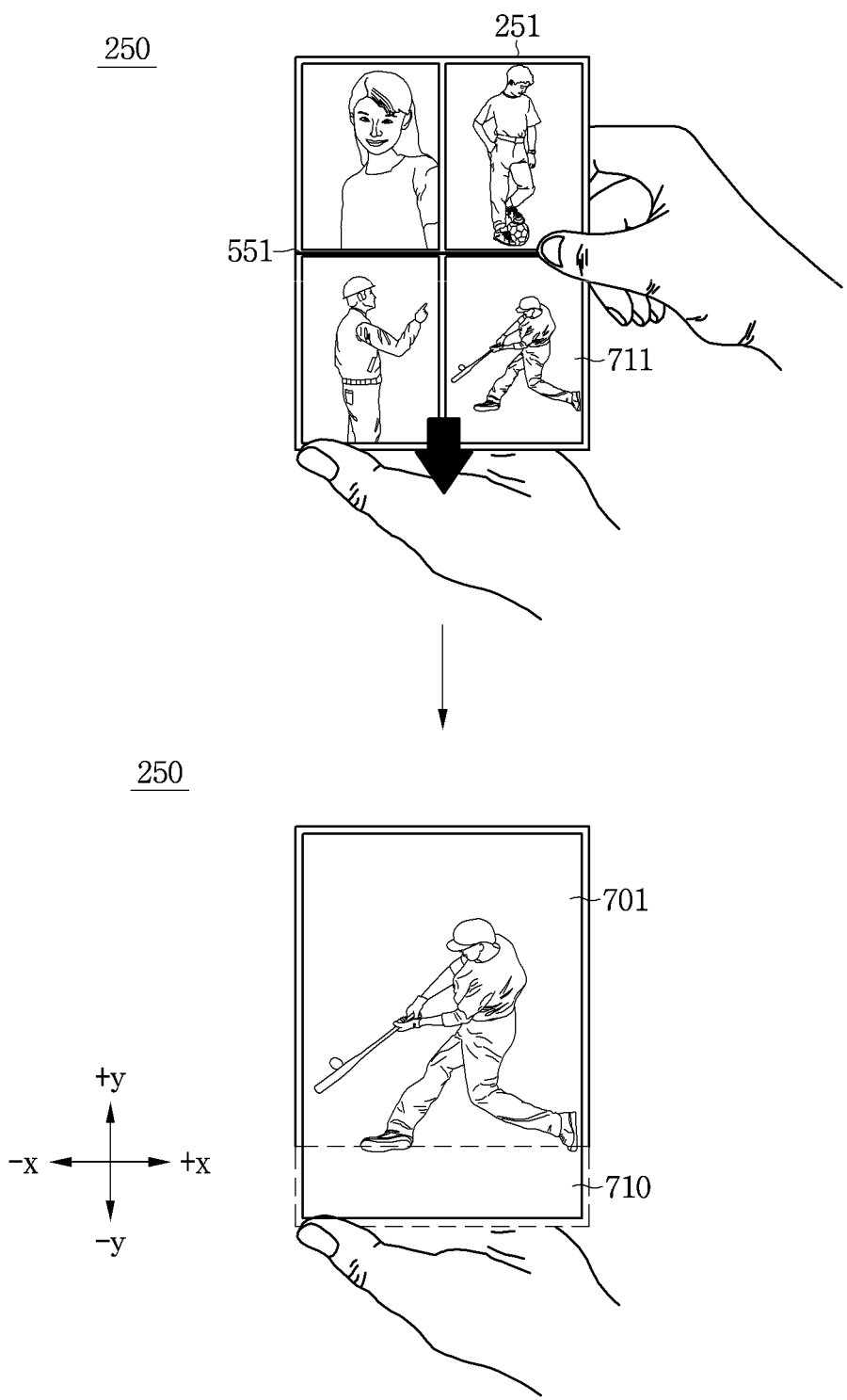

FIGS. 29 and 30 are views illustrating embodiments that the display unit is stretched base on an obtained stretch criterion when the area designation input is an input selecting a content item according to an embodiment. Referring to FIG. 29, the display unit 250 may display a plurality of images. When a touch input for selecting a specific image 711 among the plurality of images is received, the controller 290 can obtain as the stretch criterion the x-axis direction line 551 passing a touch point corresponding to the received touch input.

The x-axis direction line 551 may be displayed on the display unit 250 according to the reception of the touch input. When the force is applied in the −y-axis direction, the controller 290 can stretch only an area positioned in the −y-axis direction based on the x-axis direction line 511 in the entire area of the display unit 250. Accordingly, the display unit 250 may be stretched by a specific area 710. The controller 290 can control the display unit 250 to enlarge to display the selected specific image 711 while stretching only an area positioned in the −y-axis direction based on the x-axis direction line 551 in the entire area of the display unit 250. The specific image 711 may be enlarged to be displayed only in the −y-axis direction of the x-axis direction line 551.

According to another embodiment, when a touch input for selecting the specific image 711 is received among the plurality of images, the controller 290 can obtain the first corner 251 position in the +y-axis direction of a touch point corresponding to the received touch input as the stretch criterion.

Next, description is provided in relation to FIG. 30. Referring to FIG. 30, the display unit 250 may display a plurality of images. When a touch input for selecting a specific image 711 is received among the plurality of images, the controller 290 can obtain the x-axis direction line 551 passing a touch point corresponding to the received touch input as the stretch criterion. The x-axis direction line 551 may be displayed on the display unit 250 according to the reception of the touch input.

When the force is applied in the −y-axis direction, the controller 290 can stretch only an area positioned in the −y-axis direction based on the x-axis direction line 511 in the entire area of the display unit 250. Accordingly, the display unit 250 may be stretched by a specific area 710. The controller 290 can control the display unit 250 to enlarge to display the selected specific image 711 while stretching only an area positioned in the −y-axis direction based on the x-axis direction line 551 in the entire area of the display unit 250.

According to another embodiment, when a touch input for selecting the specific image 711 is received among the plurality of images, the controller 290 can obtain the first corner 251 positioned in the +y-axis direction of a touch point corresponding to the received touch input. According to another embodiment, the stretch criterion may receive to obtain the area designation input through a touch pen. The display unit 250 may be stretched according to the stretch criterion obtained through the touch pen and a direction of the applied force.

Figure 31:
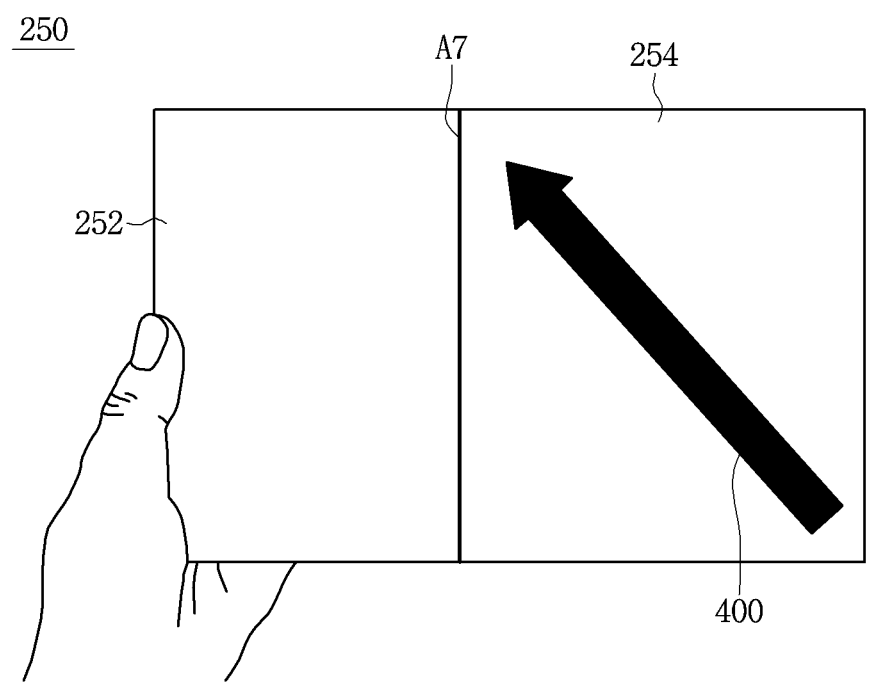
FIGS. 31 to 33 are views illustrating embodiments that a stretch criterion is obtained through a touch pen, and a partial area of a display unit is stretched according to the obtained stretch criterion and a direction of an applied force.
Figure 32:
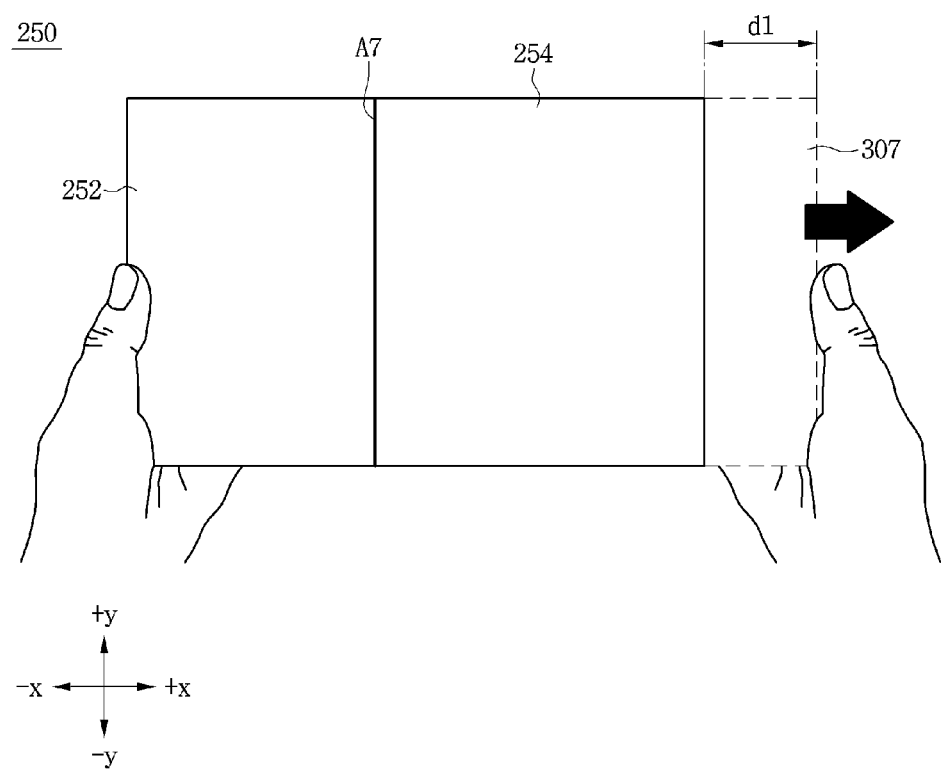
Figure 33:
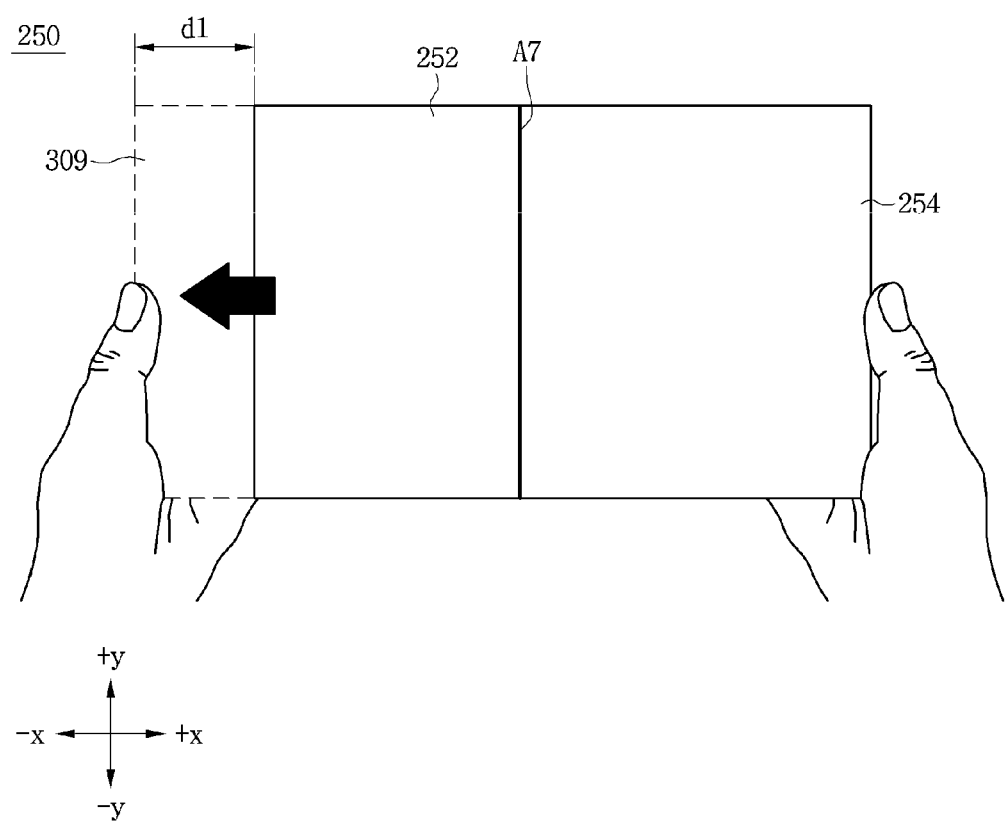

Descriptions about this will be provided with reference to FIGS. 31 to 33. In particular, FIGS. 31 to 33 are views illustrating an embodiment in which the stretch criterion is obtained through the touch pen and a partial area of the display unit is stretched according to the obtained stretch criterion and the direction of the applied force.

Referring to FIG. 31, the controller 290 can receive an input drawing the y-axis direction line A7 on the display unit 250 through the touch pen 400. The controller 290 can obtain the y-axis direction line A7 as the stretch criterion. The entire area of the display unit 250 may be divided into a ninth area 252 and a tenth area 254 along the y-axis direction line A7. As illustrated in FIG. 32, when a force is applied in the +x-axis direction, the controller 250 may stretch only the tenth area 254 of the entire area of the display unit 250. The tenth area 254 may be stretched by the specific area 307 having the stretch distance d1.

As illustrated in FIG. 33, when a force is applied in the −x-axis direction, the controller 290 can stretch only the ninth area 252 of the entire area of the display unit 250. The ninth area 252 may be stretched by the specific area 309 having the stretch distance d2. According to another embodiment, the stretch criterion may be obtained according to an input for bending the stretchable display device 200. The display unit 250 may be stretched according to the stretch criterion obtained through the bending input and the direction of the applied force. Descriptions about this will be provided with reference to FIGS. 34 and 35.

Figure 34:
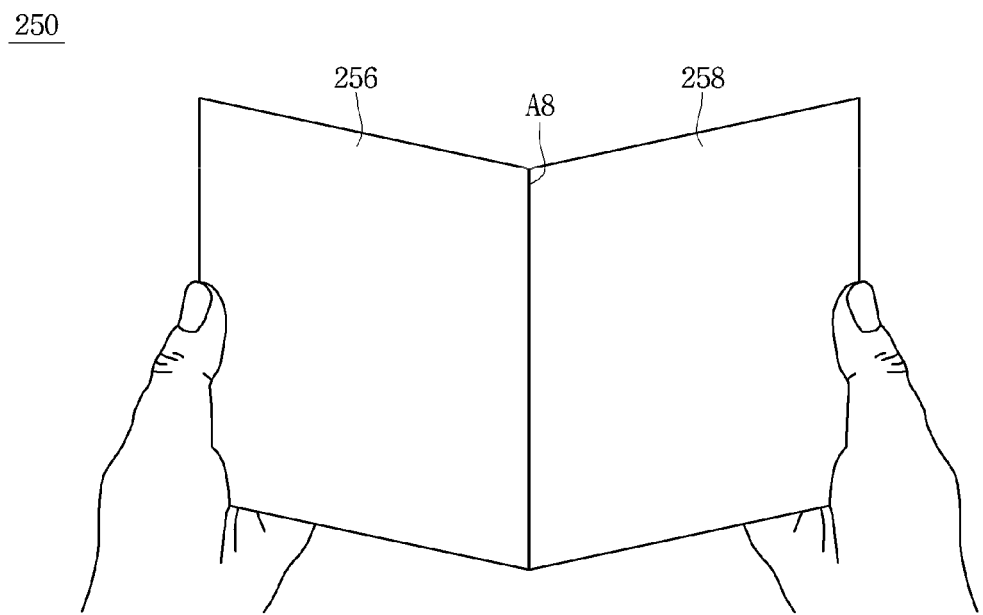
FIGS. 34 to 35 are views illustrating embodiments that a stretch criterion is obtained according to an input for bending the stretchable display device, and a partial area of a display unit is stretched according to the obtained stretch criterion and a direction of an applied force.
Figure 35:
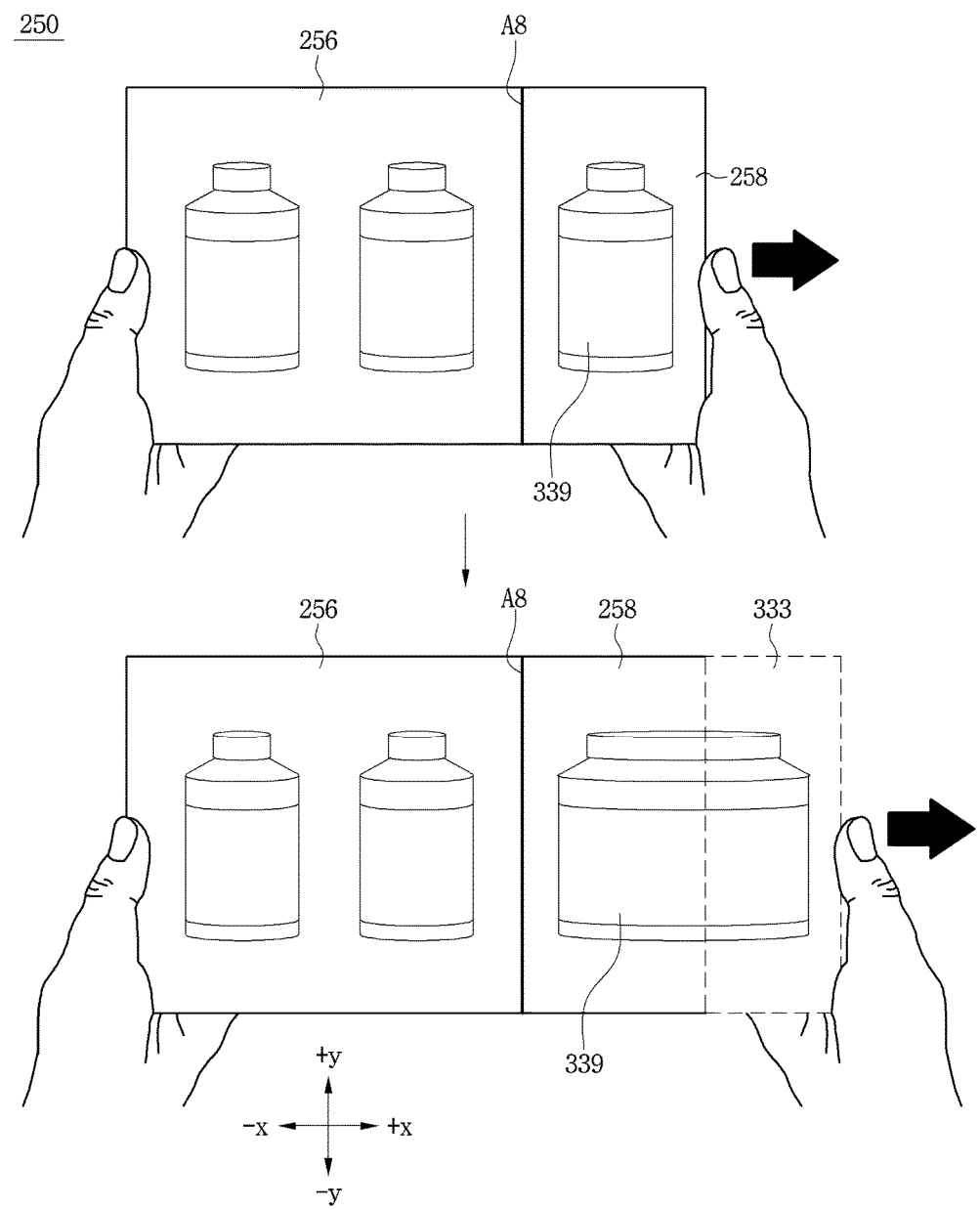

FIGS. 34 and 35 are views illustrating an embodiment in which the stretch criterion is obtained through an input for bending the stretchable display device 200 and a partial area of the display unit is stretched according to the obtained stretch criterion and the direction of the applied force.

Referring to FIG. 34, the controller 290 can control the display unit 250 to display a y-axis direction line A8 corresponding to a folded portion on the display unit 250 according to a force for folding the display unit 250. The controller 290 can obtain the y-axis direction line A8 as the stretch criterion. The entire area of the display unit 250 may be divided unto an eleventh area 256 and a twelfth area 258 along the y-axis direction line A8.

As illustrated in FIG. 35, when a force is applied in the +x-axis direction, the controller 290 can stretch only the twelfth area 258 of the entire area of the display unit 250. The twelfth area 258 may be stretched by a specific area 333. The product image 339 displayed on the twelfth area 258 before the stretch may be enlarged according to a ratio of the stretched specific area 333 and displayed as the twelfth area 258 of the display unit 250 is stretched by the specific area 333

The user can more accurately view desired information only with an operation of folding the stretchable display device 200 and an operation applying a force to the stretchable display device 200 in a specific direction.

Next, a configuration of a mobile terminal included in the stretchable display device 200 is described with reference to FIG. 36. The mobile terminal described herein may include a mobile phone, smart phone, laptop computer, terminal for digital broadcast, personal digital assistants (PDA), portable multimedia player (PMP), navigator, slate PC, tablet PC, ultrabook, or wearable device, for example, a smart watch, smart glass, and head mounted display (HMD).

However, those skilled in the art may easily understand that the configuration according to the embodiment described herein may be also applied to a stationary terminal such as a digital TV, desk computer, or digital signage when a case of being applicable only to the mobile terminal is excluded.

Figure 36:
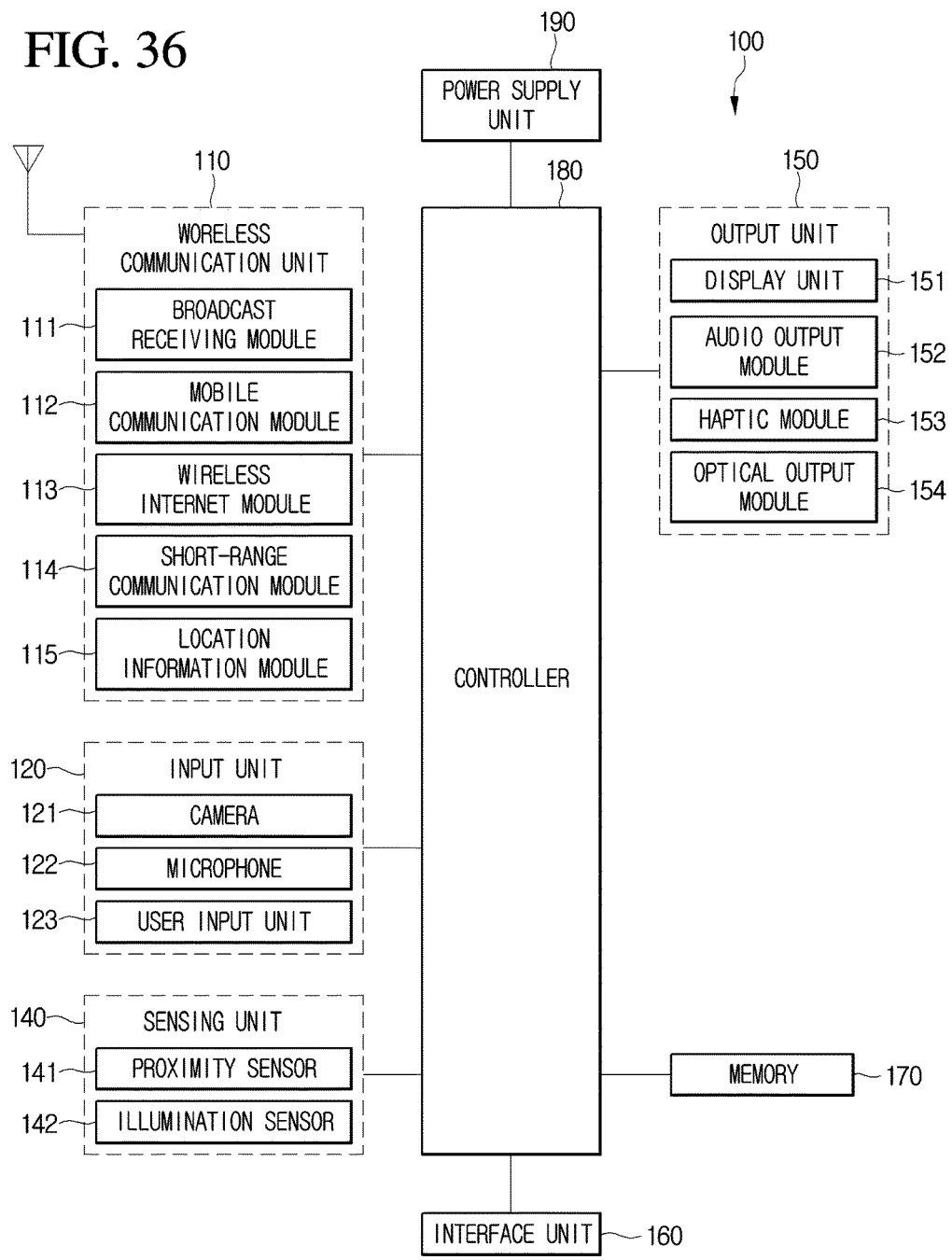
FIG. 36 is a block diagram illustrating explaining a mobile terminal related to an embodiment.

FIG. 36 is a block diagram illustrating explaining a mobile terminal in relation to an embodiment. In this instance, the stretchable display 200 may include elements of the mobile terminal 100. In particular, the sensing unit 210 of the stretchable display device 200 may perform a function of the sensing unit 140 of the mobile terminal 100, the display unit 250 may perform a function of the display unit 152 of the mobile terminal 250, and the storage unit 270 may perform a function of the memory 170 of the mobile terminal 270.

The mobile terminal 100 may include a wireless communication unit 110, an input unit 120, a sensing unit 140, an output unit 150, an interface unit 160, a memory unit 170, a controller 180, and a power supply unit 190. Since the elements illustrated in FIG. 1 are not essential for realizing a mobile terminal, a mobile terminal to be described herein may include more or fewer elements than the above-described.

In more detail, the wireless communication unit 110 among the elements may include one or more modules enabling wireless communication between the mobile terminal 100 and another mobile terminal 100, or between the mobile terminal 100 and an external server. In addition, the wireless communication 110 may include one or more modules connecting the mobile terminal 100 to one or more networks.

The wireless communication unit 110 may include at least one of a broadcast reception module 111, a mobile communication module 112, a wireless internet module 113, a short range communication module 114, and a location information module 115.

The input unit 130 may include a camera 121 or an image input unit for an image signal input, a microphone 122 or an audio input unit for an audio signal input, a user input unit 123 (e.g., a touch key, a mechanical key, etc.) for receiving information from a user. Voice data or image data collected by the input unit 120 may be analyzed and processed with user's control commands.

The sensing unit 140 may include at least one sensor for sensing at least one of surrounding environment information around the mobile terminal and user information. For example, the sensing unit 140 may include at least one selected from a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera 121), a microphone 122, a battery gauge, an environmental sensor (e.g., a barometer, a hygrometer, a thermometer, a radiation sensor, a thermal sensor, a gas detection sensor, etc.), a chemical sensor (e.g., an e-nose, a healthcare sensor, a biometric sensor, etc.). Furthermore, the mobile terminal disclosed herein may combine and use information sensed by at least two sensors among those sensors.

The output unit 150 is for generating an output related to sense of sight, sense of hearing, or sense of touch, and may include at least one selected from a display unit 151, an audio output unit 152, a haptic module 153, and a light output unit 154. The display unit 151 may form a mutually layered structure with or be formed into one with a touch sensor, and realize a touch screen. Such a touch screen may not only function as the user input unit 123 providing an input interface between the mobile terminal 100 and the user, but also provide an output interface between the mobile terminal 100 and the user.

The interface unit 160 plays a role of a passage with various kinds of external devices connected to the mobile terminal 100. This interface unit 160 may include at least one selected from a wired/wireless headset port, an external charger port, a wired/wireless data port, a memory card port, a port connecting a device having an identification module prepared therein, an audio input/output (I/O) port, a video input/output (I/O) port, and an earphone port. In the mobile terminal 100, a proper control may be performed on a connected external device in correspondence to connection between the external device and the interface unit 160.

In addition, the memory 170 stores data for supporting various functions of the mobile terminal 100. The memory 170 may store a plurality of application programs or applications driven in the mobile terminal 100, data for operations of the mobile terminal 100, and instructions. At least a part of these application programs may exist in the mobile terminal 100 at the time of release for basic functions (e.g., a call originating or receiving function, a message transmitting and receiving function). Moreover, the application programs are stored in the memory 170 and installed in the mobile terminal 100, and then may be driven to perform operations (or functions) of the mobile terminal by the controller 180.

The controller 180 typically controls overall operations of the mobile terminal 100 besides operations related to the application programs. The controller 180 can provide the user with, or process proper information or functions by processing a signal, data, or information input or output through the above-described elements, or driving the application programs stored in the memory 170.

In addition, the controller 180 may control at least a part of the elements illustrated in FIG. 36 so as to drive the application programs stored in the memory 170. Furthermore, the controller 180 may combine at least two elements among the elements included in the mobile terminal 100 and operate the combined.

The power supply unit 190 receives internal or external power under a control of the controller 180 and supplies the power to each element included in the mobile terminal 100. The power supply unit 190 includes a battery and the battery may be an embedded type battery or a replaceable battery.

At least a part of the elements may operate in cooperation with each other for realizing an operation, control, or control method of the mobile terminal according to various embodiments. In addition, the operation, control, or control method of the mobile terminal may be realized in the mobile terminal by driving at least one application program stored in the memory 170.

Hereinafter, the above-described elements are described in detail with reference to FIG. 36 before describing various embodiments realized through the mobile terminal 100.

Firstly, in the wireless communication unit 110, the broadcast reception module 111 receives a broadcast signal and/or broadcast related information from an external broadcast management server through a broadcast channel. The broadcast channel may include a satellite channel or a terrestrial channel. Two or more broadcast reception modules may be provided to the mobile terminal 100 for simultaneous broadcast reception or broadcast channel switching for at least two broadcast channels.

The mobile communication module 112 may transmit and receive wireless signals to and from at least one selected from a base station, an external terminal, and a server on a mobile communication network constructed according to technical standards or communication schemes for the mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A) etc.). The wireless signal may include a voice call signal, a video call signal, or various types of data according to transmission and reception of a text/multimedia message.

The wireless internet module 113 refers to a module for a wireless internet connection, and may be embedded in or prepared outside the mobile terminal 100. The wireless internet module 113 is configured to transmit and receive a wireless signal over a communication network conforming for wireless internet technologies.

The wireless internet technologies include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and LTE-Advanced (LTE-A), and the wireless internet module 113 transmits and receives data according to at least one wireless internet technology within the range of including internet technology not described in the above.

From a viewpoint that an access to the wireless internet through WiBro, HSDPA, HSUPA, GSM, CDMA, WCDMA, LTE, or LTE-A is conducted through a mobile communication network, the wireless internet module 113 conducting the access to the wireless internet through the mobile communication network may be understood as a kind of the mobile communication module 112.

The short range communication module 114 is for short range communication and may support the short range communication by using at least one selected from Bluetooth™, Radio Frequency Identification (RFID), Infrared Data Association (IrDA), Ultra Wideband UWB), ZigBee, Near Field Communication (NFC), Wi-Fi, Wi-Fi Direct, and Wireless Universal Serial Bus (Wireless USB) technologies. This short range communication module 114 may support, through a wireless area network, wireless communication between the mobile communication terminal 100 and a wireless communication system, between the mobile terminal 100 and another mobile terminal 100, or between the mobile terminal 100 and a network on which the other mobile terminal 100 or an external server is located. The wireless area network may be a wireless personal area network.

Here, the other mobile terminal 100 may be a wearable device (e.g., a smart watch, a smart glass, or an HMD) through which data is mutually exchangeable (or interoperable) with the mobile terminal 100 according to an embodiment. The short range communication module 114 may detect (or recognize) a wearable device capable of communicating with the mobile terminal 100. Furthermore, when the detected wearable device is authenticated to communicate with the mobile terminal 100, the controller 180 may transmit at least a part of data processed in the mobile terminal 100 to the wearable device through the short range communication module 114. Therefore, a user of the wearable device may use the data processed by the mobile terminal 100 through the wearable device. For example, when a call is received by the mobile terminal 100, the user may perform a phone call through the wearable device, or when a message is received by the mobile terminal 100, the user may check the received message through the wearable device.

The location information module 115 is for obtaining a location (or a current location) of the mobile terminal. As a representative example thereof, there is a global positioning system (GPS) module or a Wi-Fi module. For example, when adopting the GPS module, the mobile terminal may obtain a location of the mobile terminal by using a signal transmitted from a GPS satellite. In another example, when adopting the Wi-Fi module, the mobile terminal may obtain the location of the mobile terminal based on information on a wireless access point (AP) transmitting or receiving a wireless signal with the Wi-Fi module. If necessary, the location information module 115 may additionally or alternatively perform any one function among other modules in the wireless communication unit 110 in order to obtain data about the location of the mobile terminal. The location information module 115 is a module used for obtaining the location (or current location) of the mobile terminal, and is not limited to a module directly calculating or obtaining the location of the mobile terminal.

Next, the input unit 120 is for receiving image information (or an image signal), audio information (or an audio signal), data, or information input from the user. The mobile terminal 100 may include one or a plurality of cameras 121 for an input of image information. The camera 121 processes an image frame such as a still image or video obtained by an image sensor in a video call mode or an image capturing mode. The processed image frame may be displayed on the display unit 151 or stored in the memory 170. Furthermore, the plurality of cameras 121 prepared in the mobile terminal 100 may be arranged to form a matrix structure, and, through the cameras 121 forming this matrix structure, a plurality of pieces of information on images having different angles or different focuses may be input to the mobile terminal 100. In addition, the plurality of cameras 121 may be arranged in a stereo structure to obtain left and right images for realizing a stereoscopic image.

The microphone 122 may process an external sound signal as electrical voice data. The processed voice data may be variously used according to a function (or an application program) being performed in the mobile terminal 100. Furthermore, various noise removal algorithms may be implemented for removing noise generated in a process for receiving the external sound signal.

The user input unit 123 is for receiving information from the user. When information is input through the user input unit 123, the controller 180 may control an operation of the mobile terminal 100 in correspondence to the input information. This user input unit 123 may include a mechanical input unit (or mechanical key, for example, buttons positioned on the front and rear surfaces or on the side surfaces, a dome switch, a jog wheel, or a jog switch, etc.) and a touch type input unit. As an example, the touch type input unit may be configured with a virtual key displayed on a touch screen through a software processing, a soft key, or a visual key, or a touch key disposed on a portion other than the touch screen. In addition, the virtual key or the visual key is possibly displayed on the touch screen in various types and, for example, may be configured with graphics, texts, icons, videos, or a combination thereof.

Furthermore, the sensing unit 140 may sense at least one of environmental information surrounding the mobile terminal 100 and user information, and generate a sensing signal corresponding to the sensed information. The controller 180 may control driving or operations of the mobile terminal 100, or perform data processing, a function, or an operation related to an application program installed in the mobile terminal 100, based on the sensing signal. Hereinafter, representative sensors among various sensors that may be included in the sensing unit 140 are described in detail.

Firstly, the proximity sensor 141 refers to a sensor detecting presence of an object accessing or around a predetermined detecting surface by using an electromagnetic force or an infrared ray without a mechanical contact. This proximity sensor 141 may be disposed in an internal area of the mobile terminal surrounded by the above-described touch screen or around the touch screen.

As an example of the proximity sensor 141, there is a transmissive optoelectronic sensor, a diffuse optoelectronic sensor, a high frequency oscillating proximity sensor, a capacitive proximity sensor, an inductive proximity sensor, or an infrared proximity sensor. When the touch screen is capacitive type, the proximity sensor 141 may be configured to detect an access of an object having conductivity by a change of an electric field according to the access of the object. In this instance, the touch screen (or a touch sensor) itself may be classified into a proximity sensor.

Moreover, for convenience of explanation, a behavior that an object is in proximity to the touch screen without contacting the touch screen and is allowed to be recognized as if the object is on the touch screen is referred to as a "proximity touch". A behavior that an object actually contacts the touch screen is referred to as a "contact touch". A position at which an object is subject to a proximity touch over the touch screen means a position at which the object vertically corresponds to the touch screen when the object is subject to the proximity touch. The proximity sensor 141 may detect a proximity touch and a proximity touch pattern (e.g., a proximity touch distance, a proximity touch direction, a proximity touch speed, a proximity touch time, a proximity touch position, a proximity touch shift state, etc.). Furthermore, the controller 180 may process data (or information) corresponding to a proximity touch action and the proximity touch pattern detected through the proximity sensor 141 and, in addition, may output visual information corresponding to the processed data on the touch screen. In addition, the controller 180 may control the mobile terminal 100 so that different operations or different data (or information) are processed according to whether a touch for an identical point on the touch screen is a proximity touch or a contact touch.

The touch sensor senses a touch (or a touch input) applied to the touch screen (or the display unit 151) by using at least one of various touch schemes including a resistive-film scheme, a capacitive scheme, an infrared ray scheme, an ultrasonic scheme, and a magnetic field scheme.

As an example, the touch sensor may be configured to convert a change in pressure applied to a specific part or a change in capacitance generated at a specific part of the touch screen into an electrical input signal. The touch sensor may be configured to detect a position or an area thereon which is touched by a touch object touching the touch screen, or pressure or capacitance at the time of the touch. Here, the touch object may be an object applying a touch on the touch sensor, for example, a finger, a touch pen, a stylus pen, or a pointer.

In this way, when there is a touch input on the touch sensor, a signal (signals) corresponding thereto is (are) transmitted to a touch controller. The touch controller processes the signal(s) and transmits corresponding data to the controller 180. Accordingly, the controller 180 may know which area of the display unit 151 is touched. Here, the touch controller may be a separate element other than the controller 180, or be the controller unit itself.

Furthermore, the controller 180 may perform different controls or an identical control according to a kind of the touch object, which touches the touch screen (or a touch key prepared other than the touch screen). Whether to perform different controls or an identical control according to a kind of the touch object may be determined according to a current operation state of the mobile terminal 100 or an application program being executed.

The above-described touch sensor and proximity sensor may sense independently or in a combined manner various types of touches on the touch screen, wherein the touches include a short (or a tap) touch, a long touch, a multi-touch, a drag touch, a flick touch, a pinch-in touch, a pinch-out, a swipe touch, and a hovering touch.

The ultrasonic sensor may recognize position information on a touch object by using an ultrasonic wave. The controller 180 can calculate a position of a wave generating source through information sensed by an optical sensor and a plurality of ultrasonic sensors. The position of the wave generating source may be calculated by using a property that a light is very faster than the ultrasonic wave, in other words, a time that a light arrives at an optical sensor is very shorter than a time that an ultrasound wave arrives at an ultrasonic sensor. In more detail, the position of the wave generating source may be calculated by using a time difference from a time when an ultrasonic wave arrives with a light considered as a reference signal.

Furthermore, from a view of a configuration of the input unit 120, the camera 121 includes at least one selected from a camera sensor (e.g., a CCD, or a CMOS sensor), a photo sensor (or an image sensor), and a laser sensor. The camera 121 and the laser sensor may be combined together and sense a touch of the sensing target for a 3-dimensional stereoscopic image. The photo sensor may be stacked on a display element, and this photo sensor scans a movement of the sensing target close to the touch screen. In more detail, the photo sensor includes photo diodes and transistors in rows/columns and scans a target mounted on the photo sensor by using an electrical signal changed according to an amount of a light applied to the photo diodes. In other words, the photo sensor performs coordinate calculation on the sensing target according to a change amount of the light and, through this, position information on the sensing target may be obtained.

The display unit 151 displays (outputs) information processed by the mobile terminal 100. For example, the display unit 151 may display execution screen information on the application program driven in the mobile terminal 100 or user interface (UI) information or graphic user interface (GUI) information according to the execution screen information. In addition, the display unit 151 may be configured as a stereoscopic display unit displaying a stereoscopic image. A 3-dimensional display scheme such as a stereoscopic scheme (glasses type), an autostereoscopic scheme (glassless type), or a projection scheme (a holographic scheme) may be applied to the stereoscopic display unit.

The sound output unit 152 may output audio data received from the wireless communication unit 110 or stored in the memory 170 in a call signal reception mode, a call mode or a recording mode, a speech recognition mode, or in a broadcast reception mode. The sound output unit 152 may output a sound signal related to a function (e.g., a call signal reception sound, or a message reception sound, etc.) performed in the mobile terminal 100. This sound output unit 152 may include a receiver, a speaker, or a buzzer, etc.

The haptic module 153 may generate various tactile effects that the user may feel. A representative example of the tactile effect that is generated by the haptic module 153 may be vibration. Strength and a pattern of the vibration generated by the haptic module 153 may be controlled by user selection or setting by the controller. For example, the haptic module 153 may output different vibrations sequentially or by synthesizing them.

Besides the vibration, the haptic module 153 may generate various tactile effects including an effect by a stimulus such as a pin array moving vertically to a contact skin surface, a air discharge force or air absorptive power through an outlet or an inlet, brush against a skin surface, contact to an electrode, or static electricity, and an effect by reproducing a cold and warmth sense by using a device that heat absorption or heating is enabled.

The haptic module 153 may be implemented to transfer the tactile effect through a direct contact, and may also be implemented for the user to feel the tactile effect through a muscle sense of a finger or an arm. The haptic module 153 may be prepared two or more in number according to a configuration aspect of the mobile terminal 100.

The optical output unit 154 may output a signal for notifying an event occurrence by using a light from an optical source of the mobile terminal 100. The event occurred in the mobile terminal 100 may be exemplified with message reception, call signal reception, missed calls, alarm, schedule notification, email reception, or information reception through an application. The signal output by the optical output unit 154 is implemented according to that the mobile terminal emits a monochromatic light or a multichromatic light towards the front or rear surface. The signal output may be completed when the mobile terminal detects that the user checks the event.

The interface unit 160 may play a role of a passage with all external devices connected to the mobile terminal 100. The interface unit 160 may receive data from the external device, receive power and transfer the power to each element inside the mobile terminal 100, or allow internal data of the mobile terminal 100 to be transmitted to the external device. For example, the interface 160 may include a wired/wireless headset port, an external charger port, a wired/wireless data port, a memory card port, a port connecting a device that an identification module is prepared, an audio input/output (I/O) port, a video input/output (I/O) port, or an earphone port, etc.

Furthermore, the identification module is a chip storing various pieces of information for authenticating user's authority for the mobile terminal 100 and may include a user identify module (UIM), a subscriber identity module (SIM) or a universal subscriber identity module (USIM). A device including the identification module (hereinafter, an 'identification device') may be manufactured in a smart card type. Accordingly, the identification device may be connected to the mobile terminal 100 through the interface unit 160.

In addition, when the mobile terminal 100 is connected to an external cradle, the interface unit 160 may be a passage through which power is supplied from the cradle to the mobile terminal 100 or a passage through which various command signals input from the cradle by the user are delivered. The various command signals or the power input from the cradle may operate as signals for perceiving that the mobile terminal 100 is accurately mounted in the cradle.

The memory 170 may store a program for operations of the controller 180 and temporarily store input/output data (e.g., a phone book, messages, still images, videos, etc.). The memory 170 may store data about vibrations of various patterns and sounds at the time of a touch input on the touch screen.

The memory 170 may include at least one storage medium type among a flash memory type, a hard disk type, a Solid State Disk (SSD) type, a Silicon Disk Drive (SDD) type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc. The mobile terminal 100 may operate in relation to a web storage performing a storage function of the memory 170 over the internet.

Furthermore, as described above, the controller 180 normally controls overall operations and an operation related to an application program of the mobile terminal 100. For example, when a state of the mobile terminal satisfies a set condition, the controller 180 executes or releases a lock state that limits an input of a user's control command to applications.

In addition, the controller 180 can perform a control or a process related to a voice call, data communication, or a video call, etc., or may perform a pattern recognition processing for recognizing a written input and a drawing input performed on the touch screen as a character and an image, respectively. Furthermore, the control 180 may combine and control any one of or a plurality of the above-described elements in order to implement various embodiments to be described below in the mobile terminal 100.

The power supply unit 190 receives external or internal power under a control of the controller 180 and supplies power necessary for operating each element. The power supply unit 190 includes a battery. The battery may be an embedded battery that is rechargeable and may be detachably coupled for charging. The power supply unit 190 may include a connection port, and the connection port may be configured as an example of the interface 160 to which an external charger providing power is electrically connected for charging the battery.

As another example, the power supply unit 190 may be configured to charge the battery in a wireless manner without using the connection port. In this instance, the power supply unit 190 may receive, from an external wireless power transmitting device, power by using one or more of an inductive coupling manner based on a magnetic induction phenomenon and a magnetic resonance coupling manner based on an electromagnetic resonance phenomenon.

Hereinafter, various embodiments may be implemented in a recording medium that is readable with a computer or a similar device by using software, hardware, or a combination thereof.

Next, description is made about a communication system realizable through the mobile terminal 100 according to an embodiment. Firstly, the communication system may use different wireless interfaces and/or a physical layer. For example, the wireless interface available by the communication system may include Frequency Division Multiple Access (FDMA), Time Division Multiple Access (TDMA), Code Division Multiple Access (CDMA), Universal Mobile Telecommunications Systems (UMTS) (in particular, Long Term Evolution (LTE), or Long Term Evolution-Advanced (LTE-A)), Global System for Mobile Communications (GSM), or etc.

Hereinafter, for convenience of explanation, description is made limitedly to CDMA. However, it is obvious that the embodiments may be applied to all communication systems including an Orthogonal Frequency Division Multiplexing (OFDM) wireless communication system as well as a CDMA wireless communication system.

The CDMA wireless communication system may include at least one terminal 100, at least one base station (BS, also may be referred to as Node B or Evolved Node B), at least one BS controller (BSC) and a mobile switching center (MSC). The MSC may be configured to be connected to the Public Switched Telephone Network (PSTN) and BSCs. The BSCs may be connected to the BS in pair through a backhaul line. The backhaul line may be prepared according to at least one selected from E1/T1, ATM, IP, PPP, Frame Relay, HDSL, ADSL, and xDSL. Accordingly, the plurality of BSCs may be included in a CDMA wireless communication system.

Each of a plurality of BSs may include at least one sector, and each sector may include an omni-directional antenna or an antenna indicating a specific radial direction from the BS. In addition, each sector may include two or more antennas having various types. Each BS may be configured to support a plurality of frequency allocations and each of the plurality of allocated frequencies may have specific spectrum (e.g., 1.25 MHz, or 5 MHz).

An intersection between the sector and the frequency allocation may be called as a CDMA channel. The BS may be called as a base station transceiver subsystem (BTSs). In this instance, one BSC and at least one BS are called together as a "base station". The base station may also represent a "cell site". In addition, each of a plurality of sectors for a specific BS may also be called as a plurality of cell sites. A broadcasting transmitter (BT) transmits a broadcast signal to terminals 100 operated in a system. The broadcast reception module 1 illustrated in FIG. 36 is prepared in the terminal 100 for receiving the broadcast signal transmitted by the BT.

Furthermore, in the CDMA wireless communication system, a global positioning system (GPS) may be linked for checking a location of the mobile terminal 100. A satellite is helpful for grasping the location of the mobile terminal. Useful location information may be obtained by less than two or at least two satellites. Here, the location of the mobile terminal 100 may be tracked by using all techniques, which are capable of tracking the location, as well as a GPS tracking technique. In addition, at least one of GPS satellites may be selectively or additionally responsible for transmitting satellite digital multimedia broadcasting (DMB).

The location information module 115 prepared in the mobile terminal 100 is for detecting, operating or identifying the location of the mobile terminal 100, and may representatively include a GPS module and a WiFi module. If necessary, the location information module 115 may alternatively or additionally perform any function of other modules in the wireless communication unit 110 for obtaining data for the location of the mobile terminal 100.

The GPS module 115 may precisely calculate 3D current location information according to latitude, longitude, and altitude by calculating distance information from three or more satellites and precise time information, and by applying a trigonometry to the calculated information. A method is currently widely used that calculates location and time information using three satellites, and corrects an error in the calculated location and time information using another satellite. The GPS module 115 may calculate speed information by continuously calculating a current location in real time. However, it is difficult to precisely measure the location of the mobile terminal 100 by using the GPS module in a dead zone, such as an indoor area, of the satellite signal. Accordingly, in order to compensate for location measurement in the GPS manner, a WiFi positioning system (WPS) may be used.

The WPS is a technique for tracking the location of the mobile terminal 100 using a WiFi module prepared in the mobile terminal 100 and a wireless access point (AP) transmitting or receiving a wireless signal to or from the WiFi module, and may mean a location measurement technique based on a wireless local area network (WLAN) using WiFi.

The WPS may include a WiFi positioning server, the mobile terminal 100, a wireless AP connected to the mobile terminal 100, and a database storing arbitrary wireless AP information. The mobile terminal 100 connected to the wireless AP may transmit a location information request message to the WiFi positioning server.

The WiFi positioning server extracts information on the wireless AP connected to the mobile terminal 100 based on the location information request message (or a signal) of the mobile terminal 100. The information on the wireless AP connected to the mobile terminal 100 may be transmitted to the WiFi positioning server through the mobile terminal 100 or transmitted to the WiFi positioning server from the wireless AP.

The information on the wireless AP, which is extracted based on the location information request message of the mobile terminal 100, may be at least one selected from a MAC address, a Service Set Identification (SSID), a Received Signal Strength Indicator (RSSI), Reference Signal Received Power (RSRP), Reference Signal Received Quality (RSRQ), channel information, Privacy, a Network Type, Signal Strength, and Noise Strength.

As described above, the WiFi positioning server may receive information on the wireless AP connected to the mobile terminal 100, and extract wireless AP information corresponding to the wireless AP to which the mobile terminal is being connected from the pre-constructed database. In addition, information on arbitrary wireless APs, which is stored in the database, may be information on a MAC Address, an SSID, channel information, Privacy, a Network Type, latitudinal and longitudinal coordinates of a wireless AP, a building name and floor on which the wireless AP is located, indoor detailed location information (GPS coordinates available), an address of an owner of the wireless AP, a phone number, and etc. In addition, in order to remove a wireless AP provided by using a mobile AP or an illegal MAC address in the location measurement process, the WiFi positioning server may extract a predetermined number of pieces of wireless AP information in the descending order of an RSSI.

Thereafter, the WiFi positioning server may extract (or analyze) location information on the mobile terminal 100 by using at least one piece of wireless AP information extracted from the database. The location information of the mobile terminal 100 is extracted (or analyzed) by comparing the stored and the received wireless AP information.

As a method of extracting (or analyzing) location information on the mobile terminal 100, a cell-ID method, a fingerprint method, a trigonometry, and a landmark method may be used. The cell-ID method is a method of determining a location of a wireless AP having strongest strength from among surrounding wireless AP information collected by a mobile terminal. This method is advantageous in that implementation is simple, an additional cost is not necessary, and location information may be rapidly obtained. However, when installation intensity of a wireless AP is lower, positioning precision becomes lowered.

The fingerprint method is a method of selecting a reference location in a service area, collecting signal strength information, and estimating a location through signal strength information transmitted from a mobile terminal based on the collected information. In order to use the fingerprint method, it is necessary to construct a database for propagation characteristics in advance.

The trigonometry is a method of operating a location of a mobile terminal based on a distance between coordinates of at least three wireless APs and the mobile terminal. For estimating the distances between the mobile terminal and the wireless APs, signal strength is converted into distance information, or a time of arrival (ToA) of a wireless signal, a time difference of arrival (TDoA) of a wireless signal, an angle of arrival (AoA) of a wireless signal may be used.

The landmark method is a method of measuring a location of a mobile terminal by using a landmark transmitter. Besides the above-described methods, various algorithms may be used for extracting (or analyzing) location information on a mobile terminal. The location information on the mobile terminal 100 extracted in this way may be transmitted to the mobile terminal 100 through the WiFi positioning server and the mobile terminal 100 may obtain the location information.

The mobile terminal 100 may obtain location information by being connected to at least one wireless AP. In addition, the number of wireless APs requested for obtaining the location information on the mobile terminal 100 may be variously varied according to a wireless communication environment in which the mobile terminal 100 is located.

The embodiments can also be embodied as computer readable codes on a computer readable recording medium. The computer readable recording medium includes any kind of data storage devices that can store data which can be thereafter read by a computer system. Examples of the computer readable recording medium include hard disk drive (HDD), solid state disk (SSD), read-only memory (ROM), random-access memory (RAM), CD-ROM, magnetic tape, floppy disk, and optical data storage device, and a carrier wave (such as data transmission through the Internet). In addition, the computer may include the controller 180 of the terminal. Therefore, the detailed description is not interpreted to be limited and should be considered in all respects as illustrative. The scope of the invention should be determined by reasonable interpretation of the appended claims, and all modifications within equivalent ranges of the present invention are included in the scope of the present invention.

According to various embodiments of the present disclosure, various requests from a user can be satisfied by obtaining a stretch criterion according to a direction of an applied force or a specific input and by stretching a display unit according to the obtained stretch criterion.

In addition, according to the present disclosure, user's convenience can be improved by stretching a display unit to enable hidden information before stretching to be displayed or displayed information before stretching to be enlarged and displayed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stretchable display device comprising:
   a display unit configured to be stretched in at least one direction;
   a sensing unit configured to sense information on a stretching of the display unit; and
   a controller configured to:
   stretch an entire area of the display unit based on the information on the stretching of the display unit if an area designation input for designating a designation area of the display unit to be stretched is not received,
   receive a touch input on the display unit as the area designation input,
   display an x-axis direction line and a y-axis direction line passing through a touch point corresponding to the touch input on the display unit for distinguishing the designation area to be stretched,
   obtain a designation area and a non-designation area separated by the x-axis direction line and the y-axis direction line,
   stretch the designation area according to sensing that the display unit is stretched in a y-axis direction, and
   enlarge a media content displayed in the stretched designation area.

2. The stretchable display device of claim 1, wherein the controller is further configured to stretch the entire area or the designation area of the display unit in a same direction according to the stretching of the display unit.

3. The stretchable display device of claim 1, wherein the controller is further configured to display additional hidden content in a specific area stretched according to the stretching of the display unit.

4. The stretchable display device of claim 1, wherein the controller is further configured to return the display unit to a state before the stretching of the display unit when the stretching of the display unit is no longer sensed.

5. The stretchable display device of claim 1, wherein the controller is further configured to zoom in or zoom out the content displayed on the display unit according to a force applied to the display unit in a z-axis direction different than a stretching direction.

6. The stretchable display device of claim 1, wherein the controller is further configured to fix the display unit in a stretched state according to an application of a twist force applied to the display unit.

7. The stretchable display device of claim 1, wherein the area designation input includes a touch pen input.

8. The stretchable display device of claim 1, wherein the area designation input further includes a folding of the display unit, and
wherein the controller is further configured to stretch the designation area of the display unit based on a direction line corresponding to a folded part of the display unit and a direction of the force applied to the display unit.

9. A method of controlling a stretchable display device, the method comprising:
receiving a touch input on a display unit as an area designation input;
displaying, via the controller, an x-axis direction line and a y-axis direction line passing through a touch point corresponding to the touch input on the display unit for distinguishing a designation area to be stretched in the entire area of the display unit if the area designation input is received;
obtaining a designation area and a non-designation area separated by the x-axis direction line and the y-axis direction line;
stretching, via the controller, the designation area according to sensing that the display unit is stretched in a y-axis direction; and
enlarging a media content displayed in the stretched designation area.

10. The method of claim 9, further comprising:
displaying an additional hidden content in a specific area stretched according to the stretching of the display unit.

11. The method of claim 9, further comprising:
returning the display unit to a state before the stretching of the display unit when the stretching of the display unit is no longer sensed.

12. The method of claim 9, further comprising:
zooming in or zooming out the content displayed on the display unit according to a force applied to the display unit in a z-axis direction different than a stretching direction.

13. The method of claim 9, further comprising:
fixing the display unit in a stretched state according to an application of a twist force applied to the display unit.

14. The method of claim 9, wherein the area designation input includes a touch pen input.

15. The method of claim 9, wherein the area designation input further includes a folding of the display unit, and
wherein the designation area of the display unit is stretched based on a direction line corresponding to a folded part of the display unit and a direction of the force applied to the display unit.

* * * * *